US011533156B2

United States Patent
Khoshnevisan et al.

(10) Patent No.: US 11,533,156 B2
(45) Date of Patent: Dec. 20, 2022

(54) DEMODULATION REFERENCE SIGNAL MODIFICATIONS FOR MULTIPLE SIGNALING, MULTIPLE TRANSMISSION RECEPTION POINT OPERATION

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/013,514

(22) Filed: Sep. 4, 2020

(65) Prior Publication Data
US 2021/0091915 A1 Mar. 25, 2021

Related U.S. Application Data

(60) Provisional application No. 62/902,836, filed on Sep. 19, 2019.

(51) Int. Cl.
*H04W 4/00* (2018.01)
*H04L 5/10* (2006.01)
(Continued)

(52) U.S. Cl.
CPC ............... *H04L 5/10* (2013.01); *H04L 5/005* (2013.01); *H04W 72/042* (2013.01);
(Continued)

(58) Field of Classification Search
None
See application file for complete search history.

(56) References Cited

U.S. PATENT DOCUMENTS 10,397,909 B2 * 8/2019 Seo ................. H04L 5/0053
2020/0053757 A1 * 2/2020 Bagheri ............... H04W 24/08

FOREIGN PATENT DOCUMENTS

WO    WO-2018083375 A1    5/2018

OTHER PUBLICATIONS

Huawei, et al., "Enhancements on Multi-TRP/Panel Transmission", 3GPP Draft; 3GPP TSG RAN WG1 Meeting #98, R1-1908066, 3rd Generation Partnership Project (3GPP), Mobile Competence Centre, 650, Route Des Lucioles, F-06921, Sophia-Antipolis Cedex, France, vol. RAN WG1, No. Prague, Czech Republic; Aug. 26, 2019-Aug. 30, 2019, Aug. 17, 2019 (Aug. 17, 2019), XP051764689, 23 Pages, Retrieved from the Internet: URL: http://www.3gpp.org/ftp/tsg_ran/WG1_RL1/TSGR1_98/Docs/R1-1908066.zip, [retrieved on Aug. 17, 2019], Section 2.2.2.
(Continued)

*Primary Examiner* — Zewdu A Beyen
(74) *Attorney, Agent, or Firm* — Qualcomm /Norton Rose Fulbright US LLP

(57) ABSTRACT

This disclosure provides systems, methods, and apparatus, including computer programs encoded on computer storage media, for demodulation reference signal (DMRS) and cell specific reference signal (CRS) collision avoidance procedures for wireless communication. Conventional networks and devices may be unable to perform DMRS shifting in some modes. For example, when considering two transmissions of multiple TRP modes, if a DMRS symbol for one transmission is shifted due to a collision with a CRS pattern, the alignment of the transmissions may be altered. If DMRS symbols of the transmissions are not aligned, interference or decoding failure may occur. The disclosure enables procedures for performing DMRS shifting in multiple TRP modes. For example, the DMRS symbols of both transmissions may be shifted responsive to determining an overlap
(Continued)

for one transmission. Such shifting may enable the alignment of the DMRS locations for both transmissions to enable decoding of the transmissions.

30 Claims, 12 Drawing Sheets

(51) Int. Cl.
*H04L 5/00* (2006.01)
*H04W 72/04* (2009.01)
*H04W 80/08* (2009.01)
*H04W 76/27* (2018.01)

(52) U.S. Cl.
CPC ... *H04W 72/0446* (2013.01); *H04W 72/0453* (2013.01); *H04W 72/0493* (2013.01); *H04W 76/27* (2018.02); *H04W 80/08* (2013.01); *H04L 5/001* (2013.01)

(56) References Cited

OTHER PUBLICATIONS

Huawei, et al., "Remaining Details for DL Design on Multi-TRP/Panel Transmission for eMBB", 3GPP Draft; 3GPP TSG RAN WG1 #97, R1-1906040, 3rd Generation Partnership Project (3GPP), Mobile Competence Centre; 650, Route Des Lucioles; F-06921 Sophia-Antipolis Cedex; France, vol. RAN WG1, No. Reno, USA; May 13, 2019-May 17, 2019, May 13, 2019 (May 13, 2019), XP051727497, 7 pages, Retrieved from the Internet: URL: http://www.3gpp.org/ftp/Meeting%5F3GPP%5FSYNC/RAN1/Docs/R1%2D1906040%2Ezip, [retrieved on May 13, 2019], Section 2.2.2.

International Search Report and Written Opinion—PCT/US2020/049601—ISA/EPO—dated Jan. 21, 2021.

Partial International Search Report—PCT/US2020/049601—ISA/EPO—dated Nov. 19, 2020.

Qualcomm Incorporated: "DMRS and LTE CRS Collision Handling", 3GPP TSG-RAN WG1 Meeting #98, 3GPP Draft, R1-1909235, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, pp. 1-4, Aug. 17, 2019 (Aug. 17, 2019), XP051765840, Retrieved from the Internet: URL: http://www.3gpp.org/ftp/tsg_ran/WG 1_RL 1 /TSG R 1_98/Docs/R1-1909235.zip [retrieved on Aug. 17, 2019].

\* cited by examiner

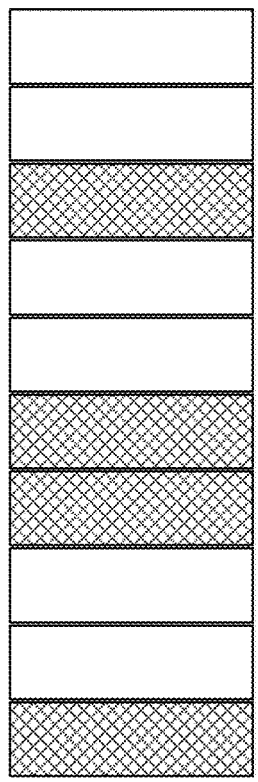
*FIG. 7A*
*DMRS*
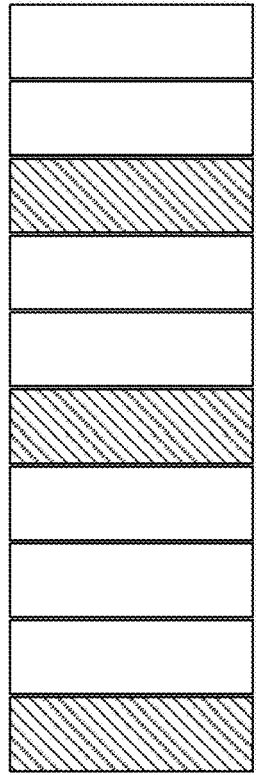
*FIG. 7B*
*CRS*
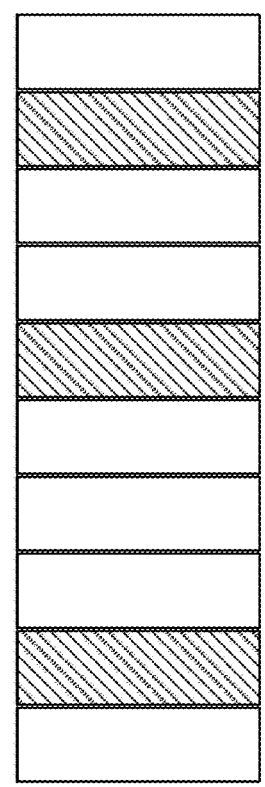
*MODIFIED DMRS*
*DMRS SHIFTING*
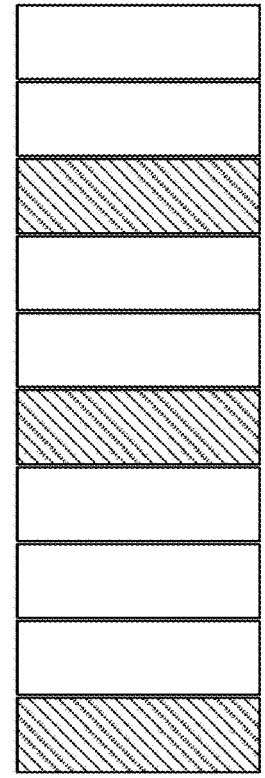
*DMRS*
*FIG. 7C*
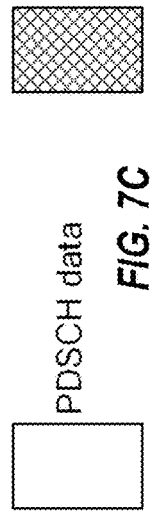
CRS
PDSCH data
PDSCH DMRS

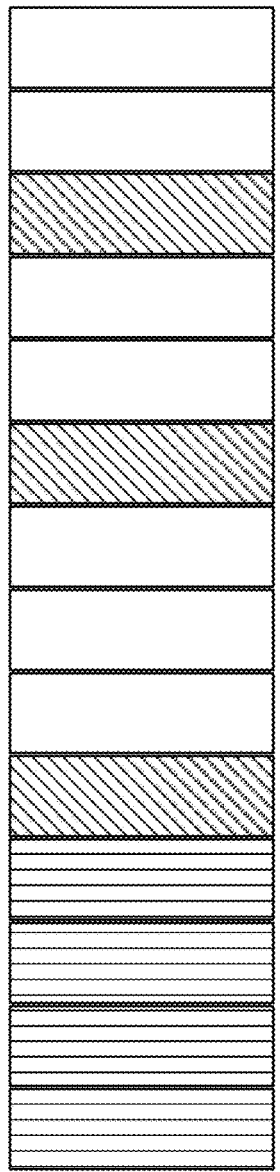
FIG. 8A
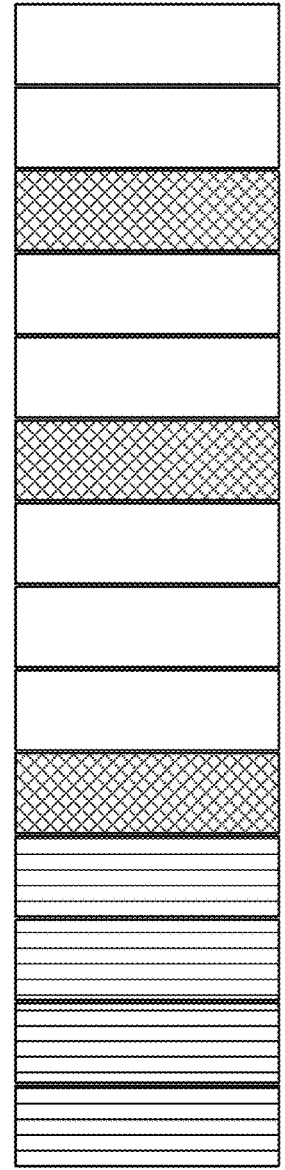
FIG. 8B

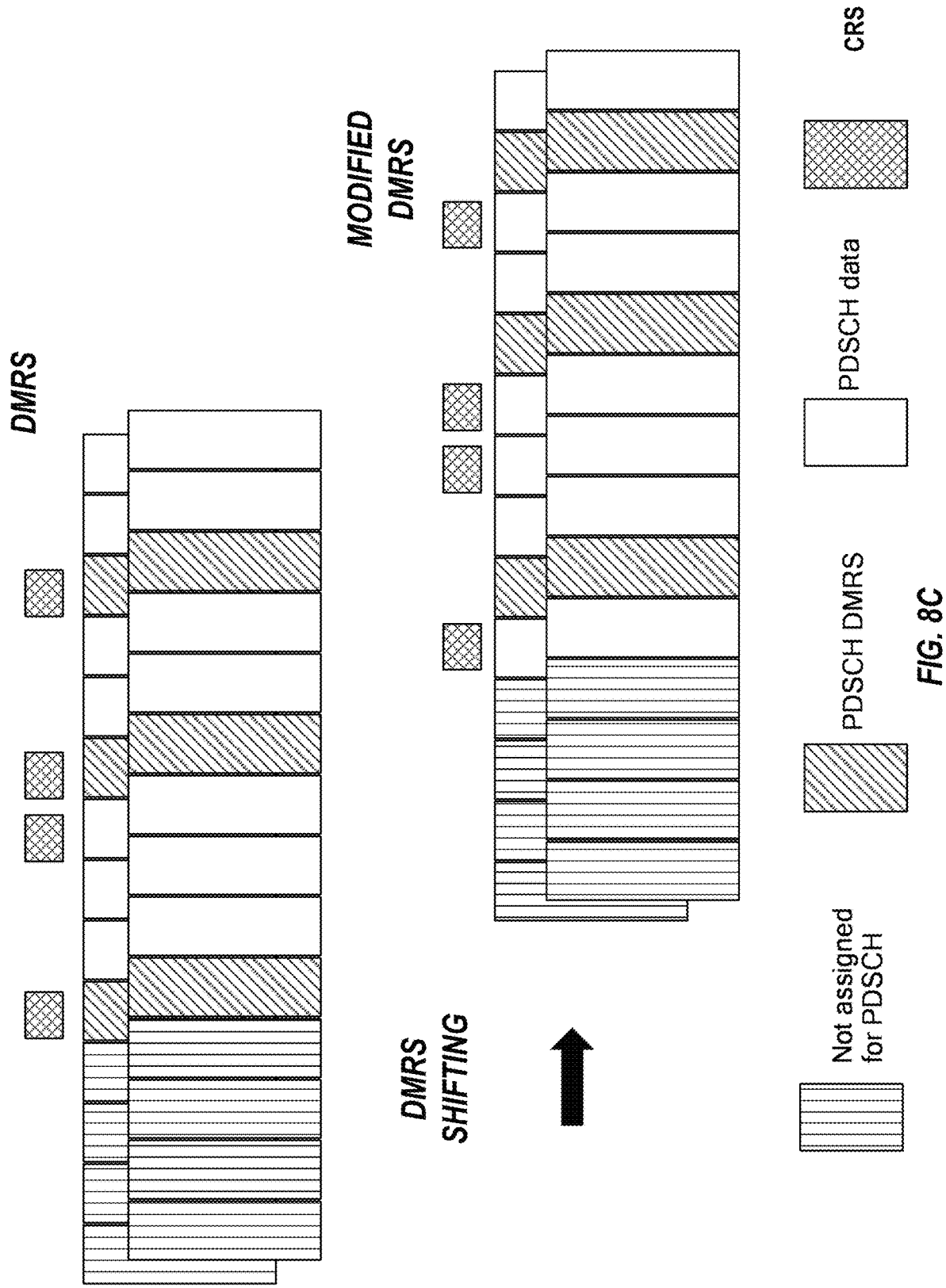

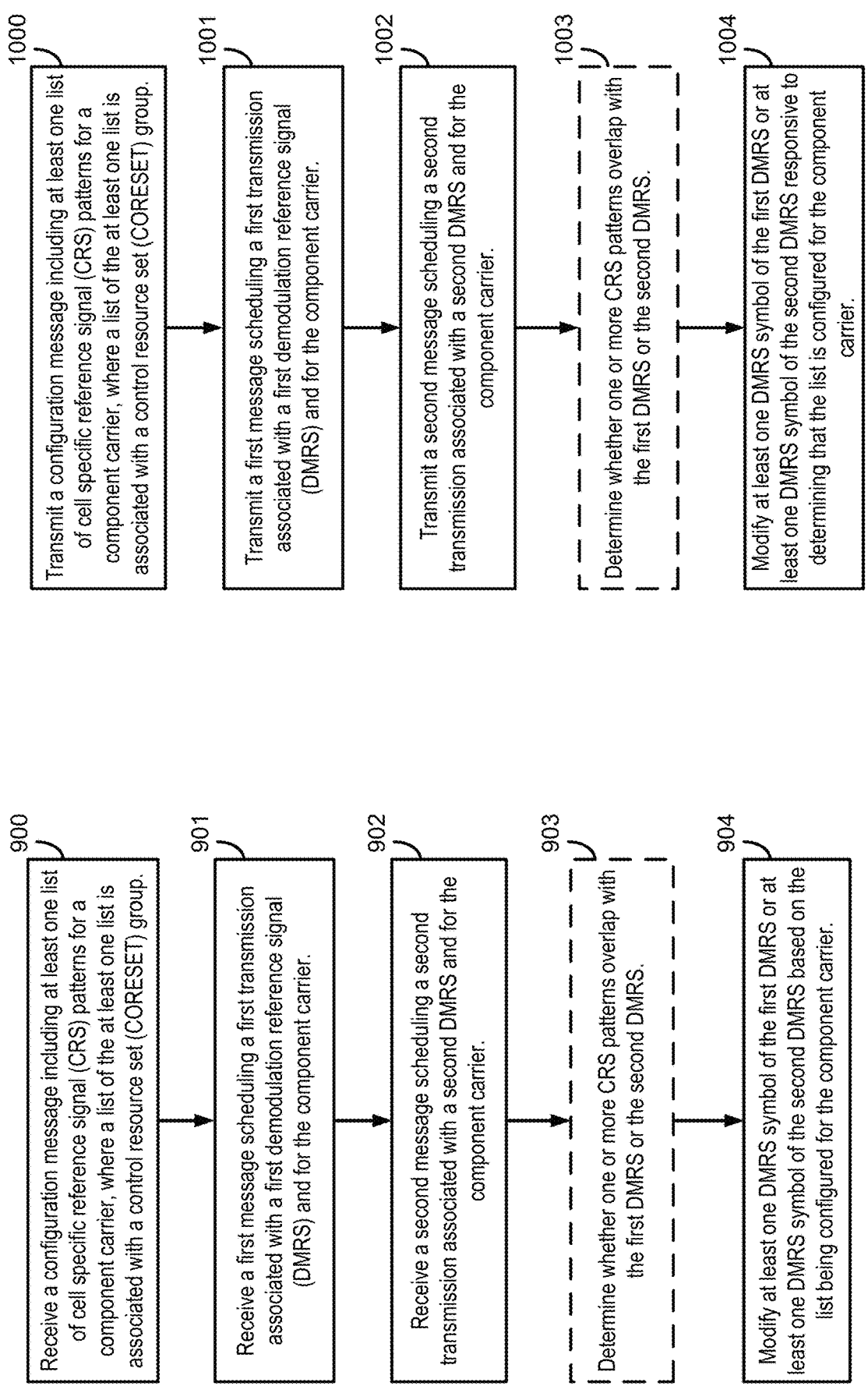

DEMODULATION REFERENCE SIGNAL MODIFICATIONS FOR MULTIPLE SIGNALING, MULTIPLE TRANSMISSION RECEPTION POINT OPERATION

CROSS-REFERENCE TO RELATED APPLICATIONS

This application claims the benefit of U.S. Provisional Patent Application No. 62/902,836, entitled, "DEMODULATION REFERENCE SIGNAL (DMRS) MODIFICATIONS FOR MULTIPLE SIGNALING, MULTIPLE TRANSMISSION RECEPTION POINT (TRP) OPERATION," filed on Sep. 19, 2019, which is expressly incorporated by reference herein in its entirety.

TECHNICAL FIELD

Aspects of the present disclosure relate generally to wireless communication systems, and more particularly, to demodulation reference signal (DMRS) and cell specific reference signal (CRS) collision avoidance procedures.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink (DL) and uplink (UL). The DL (or forward link) refers to the communication link from the base station to the UE, and the UL (or reverse link) refers to the communication link from the UE to the base station. A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but also to advance and enhance the user experience with mobile communications.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication. The method includes receiving, by a user equipment (UE), a first message scheduling a first transmission, and receiving, by the UE, a second message scheduling a second transmission. The first transmission is associated with a first demodulation reference signal (DMRS), and the second transmission is associated with a second DMRS. The method further includes determining, by the UE, whether one or more cell specific reference signal (CRS) patterns overlaps with the first DMRS or the second DMRS, and modifying, by the UE, at least one DMRS symbol of the first DMRS or at least one DMRS symbol of the second DMRS responsive to determining that at least one CRS pattern of the one or more CRS patterns overlaps with at least one DMRS symbol of the first DMRS or the second DMRS.

In some implementations, modifying the at least one DMRS symbol of the first DMRS or the at least one DMRS symbol of the second DMRS can include modifying the at least one DMRS symbol of the first DMRS and the at least one DMRS symbol of the second DMRS.

In some implementations, the method can include receiving, by the UE, the first transmission, the first transmission having modified DMRS symbols. In some such implementations, the method can include receiving, by the UE, the second transmission, the second transmission having modified DMRS symbols.

In some implementations, the first message corresponds to a first transmission reception point (TRP), and the second message corresponds to a second TRP.

In some implementations, the UE is operating in a multiple downlink control information (DCI), multiple transmission reception point (TRP) mode.

In some implementations, the first TRP is associated with a first CRS pattern, and the second TRP is associated with a second CRS pattern.

In some implementations, the first message corresponds to downlink control information (DCI).

In some implementations, the first message is a periodic grant and corresponds to downlink control information (DCI) or a Radio Resource Control (RRC) message that is configured to schedule multiple transmissions including the first transmission.

In some implementations, the first message is received on a Physical Downlink Control Channel (PDCCH).

In some implementations, the first transmission is received on a Physical Downlink Shared Channel (PDSCH).

In some implementations, modifying the at least one DMRS symbol of the first DMRS or the second DMRS can include adjusting a location of the at least one DMRS symbol of the first DMRS.

In some implementations, modifying the at least one DMRS symbol of the first DMRS or the second DMRS can include: incrementing a location value of each DMRS symbol of the first DMRS of the first transmission by one;

and incrementing a location value of each DMRS symbol of the second DMRS of the second transmission by one.

In some implementations, the method can include determining whether the first transmission at least partially overlaps with the second transmission.

In some implementations, determining whether the one or more CRS patterns overlap with the first DMRS or the second DMRS is performed responsive to determining that first resources of the first transmission at least partially overlap with second resources of the second transmission.

In some implementations, first resources of the first transmission are orthogonal to second resources of the second transmission in a time domain, a frequency domain, or both.

In some implementations, first resources of the first transmission do not overlap with second resources of the second transmission in a time domain, a frequency domain, or both.

In some implementations, the UE performs DMRS shifting for multiple downlink control information (DCI), multiple transmission reception point (TRP) modes independent of CRS and TRP associations.

In some implementations, the UE performs DMRS shifting across multiple transmission reception points (TRPs), and the UE performs rate matching per TRP.

In some implementations, the first message corresponds to a first transmission reception point (TRP) or a first control resource set (CORESET) group, and the second message corresponds to a second TRP or a second CORESET group, and the first and second CORESET groups are indicated by higher level signaling.

In some implementations, the method can include, prior to receiving the first message, transmitting, by the UE, a capabilities message indicating that the UE is configured for DMRS shifting for multiple downlink control information (DCI), multiple transmission reception point (TRP) modes.

In some implementations, the method can include, prior to receiving the first message, receiving, by the UE, a message indicating that the UE is to perform DMRS shifting for multiple downlink control information (DCI), multiple transmission reception point (TRP) modes.

Another innovative aspect of the subject matter described in this disclosure can be implemented in an apparatus configured for wireless communication. The apparatus includes at least one processor and a memory coupled to the at least one processor. The at least one processor is configured to receive, by a user equipment (UE), a first message scheduling a first transmission, the first transmission associated with a first demodulation reference signal (DMRS). The at least one processor is also configured to receive, by the UE, a second message scheduling a second transmission, the second transmission associated with a second DMRS. The at least one processor is configured to determine, by the UE, whether one or more cell specific reference signal (CRS) patterns overlaps with the first DMRS or the second DMRS. The at least one processor is further configured to modify, by the UE, at least one DMRS symbol of the first DMRS or at least one DMRS symbol of the second DMRS responsive to determining that at least one CRS pattern of the one or more CRS patterns overlaps with at least one DMRS symbol of the first DMRS or the second DMRS.

In some implementations, the apparatus is configured to perform a method as in any of the implementations described above.

Another innovative aspect of the subject matter described in this disclosure can be implemented in an apparatus configured for wireless communication. The apparatus includes means for receiving, by a user equipment (UE), a first message scheduling a first transmission, the first transmission associated with a first demodulation reference signal (DMRS). The apparatus also includes means for receiving, by the UE, a second message scheduling a second transmission, the second transmission associated with a second DMRS. The apparatus includes means for determining, by the UE, whether one or more cell specific reference signal (CRS) patterns overlaps with the first DMRS or the second DMRS. The apparatus further includes means for modifying, by the UE, at least one DMRS symbol of the first DMRS or at least one DMRS symbol of the second DMRS responsive to determining that at least one CRS pattern of the one or more CRS patterns overlaps with at least one DMRS symbol of the first DMRS or the second DMRS.

In some implementations, the apparatus is configured to perform a method as in any of the implementations described above.

Another innovative aspect of the subject matter described in this disclosure can be implemented in a non-transitory computer-readable medium storing instructions that, when executed by a processor, cause the processor to perform operations including receiving, by a user equipment (UE), a first message scheduling a first transmission, the first transmission associated with a first demodulation reference signal (DMRS). The operations also include receiving, by the UE, a second message scheduling a second transmission, the second transmission associated with a second DMRS. The operations include determining, by the UE, whether one or more cell specific reference signal (CRS) patterns overlaps with the first DMRS or the second DMRS. The operations further include modifying, by the UE, at least one DMRS symbol of the first DMRS or at least one DMRS symbol of the second DMRS responsive to determining that at least one CRS pattern of the one or more CRS patterns overlaps with at least one DMRS symbol of the first DMRS or the second DMRS.

In some implementations, the processor is configured to perform a method as in any of the implementations described above.

Another innovative aspect of the subject matter described in this disclosure can be implemented in a method of wireless communication. The method includes transmitting, by a network entity, a first message scheduling a first transmission, the first transmission associated with a first demodulation reference signal (DMRS). The method also include transmitting, by the network entity, a second message scheduling a second transmission, the second transmission associated with a second DMRS. The method includes determining, by the network entity, whether one or more cell specific reference signal (CRS) patterns overlaps with the first DMRS or the second DMRS. The method further includes modifying, by the network entity, at least one DMRS symbol of the first DMRS or at least one DMRS symbol of the second DMRS responsive to determining that at least one CRS pattern of the one or more CRS patterns overlaps with at least one DMRS symbol of the first DMRS or the second DMRS.

In some implementations, modifying the at least one DMRS symbol of the first DMRS or the at least one DMRS symbol of the second DMRS can include modifying the at least one DMRS symbol of the first DMRS and the at least one DMRS symbol of the second DMRS.

In some implementations, the method can include transmitting, by the network entity, the first transmission with a modified DMRS symbol. In some such implementations, the method can include transmitting, by the network entity, the second transmission with a modified DMRS symbol.

In some implementations, the first message corresponds to a first transmission reception point (TRP), and the second message corresponds to a second TRP.

In some implementations, the network entity is operating in a multiple downlink control information (DCI), multiple transmission reception point (TRP) mode.

In some implementations, the first TRP is associated with a first CRS pattern, and the second TRP is associated with a second CRS pattern.

In some implementations, the first message corresponds to downlink control information (DCI).

In some implementations, the first message is a periodic grant and corresponds to downlink control information (DCI) or a Radio Resource Control (RRC) message that is configured to schedule multiple transmissions including the first transmission.

In some implementations, the first message is received on a Physical Downlink Control Channel (PDCCH).

In some implementations, the first transmission is (received on?) a Physical Downlink Shared Channel (PDSCH).

In some implementations, modifying the at least one DMRS symbol of the first DMRS or the second DMRS can include adjusting a location of the at least one DMRS symbol of the first DMRS.

In some implementations, modifying the at least one DMRS symbol of the first DMRS or the second DMRS can include: incrementing a location value of each DMRS symbol of the first DMRS of the first transmission by one; and incrementing a location value of each DMRS symbol of the second DMRS of the second transmission by one.

In some implementations, first resources of the first transmission partially overlap with second resources of the second transmission in a time domain, a frequency domain, or both.

In some implementations, first resources of the first transmission fully overlap with second resources of the second transmission in a time domain, a frequency domain, or both.

In some implementations, first resources of the first transmission are orthogonal to second resources of the second transmission in a time domain, a frequency domain, or both.

In some implementations, first resources of the first transmission do not overlap with second resources of the second transmission in a time domain, a frequency domain, or both.

In some implementations, the network entity performs DMRS shifting for multiple downlink control information (DCI), multiple transmission reception point (TRP) modes independent of CRS and TRP associations.

In some implementations, the network entity performs DMRS shifting across multiple transmission reception points (TRPs), and the network entity performs rate matching per TRP.

In some implementations, the first message corresponds to a first transmission reception point (TRP) or a first control resource set (CORESET) group, and the second message corresponds to a second TRP or a second CORESET group, and the first and second CORESET groups are indicated by higher level signaling.

In some implementations, the method can include, prior to transmitting the first message, receiving, by the network entities, a capabilities message indicating that the UE is configured for DMRS shifting for multiple downlink control information (DCI), multiple transmission reception point (TRP) modes.

In some implementations, the method can include, prior to transmitting the first message, transmitting, by the network entity, a message indicating that a user equipment (UE) is to perform DMRS shifting for multiple downlink control information (DCI), multiple transmission reception point (TRP) modes.

Another innovative aspect of the subject matter described in this disclosure can be implemented in an apparatus configured for wireless communication. The apparatus includes at least one processor and a memory coupled to the at least one processor. The at least one processor is configured to transmit, by a network entity, a first message scheduling a first transmission, the first transmission associated with a first demodulation reference signal (DMRS). The at least one processor is also configured to transmit, by the network entity, a second message scheduling a second transmission, the second transmission associated with a second DMRS. The at least one processor is configured to determine, by the network entity, whether one or more cell specific reference signal (CRS) patterns overlaps with the first DMRS or the second DMRS. The at least one processor is further configured to modify, by the network entity, at least one DMRS symbol of the first DMRS or at least one DMRS symbol of the second DMRS responsive to determining that at least one CRS pattern of the one or more CRS patterns overlaps with at least one DMRS symbol of the first DMRS or the second DMRS.

In some implementations the apparatus is configured to perform a method as in any of the implementations described above.

Another innovative aspect of the subject matter described in this disclosure can be implemented in an apparatus configured for wireless communication. The apparatus includes means for transmitting, by a network entity, a first message scheduling a first transmission, the first transmission associated with a first demodulation reference signal (DMRS). The apparatus also includes means for transmitting, by the network entity, a second message scheduling a second transmission, the second transmission associated with a second DMRS. The apparatus includes means for determining, by the network entity, whether one or more cell specific reference signal (CRS) patterns overlaps with the first DMRS or the second DMRS. The apparatus further includes means for modifying, by the network entity, at least one DMRS symbol of the first DMRS or at least one DMRS symbol of the second DMRS responsive to determining that at least one CRS pattern of the one or more CRS patterns overlaps with at least one DMRS symbol of the first DMRS or the second DMRS.

In some implementations, the apparatus is configured to perform a method as in any of the implementations described above.

Another innovative aspect of the subject matter described in this disclosure can be implemented in a non-transitory computer-readable medium storing instructions that, when executed by a processor, cause the processor to perform operations including transmitting, by a network entity, a first message scheduling a first transmission, the first transmission associated with a first demodulation reference signal (DMRS). The operations also include transmitting, by the network entity, a second message scheduling a second transmission, the second transmission associated with a second DMRS. The operations include determining, by the network entity, whether one or more cell specific reference signal (CRS) patterns overlaps with the first DMRS or the second DMRS. The operations further include modifying, by the network entity, at least one DMRS symbol of the first DMRS or at least one DMRS symbol of the second DMRS responsive to determining that at least one CRS pattern of the one or more CRS patterns overlaps with at least one DMRS symbol of the first DMRS or the second DMRS.

In some implementations, the processor is configured to perform a method as in any of the implementations described above.

Another innovative aspect of the subject matter described in this disclosure can be implemented in a method of wireless communication. The method includes transmitting, by a network entity, a first message scheduling a first transmission, the first transmission associated with a first demodulation reference signal (DMRS). The method also includes determining, by the network entity, whether one or more cell specific reference signal (CRS) patterns overlaps with the first DMRS. The method includes modifying, by the network entity, at least one DMRS symbol of the first DMRS responsive to determining that at least one CRS pattern of the one or more CRS patterns overlaps with at least one DMRS symbol of the first DMRS. The method further includes transmitting, by the network entity, the first transmission with a modified DMRS symbol.

In some implementations, the method can include determining, by the network entity, whether the one or more CRS patterns overlaps with a second DMRS associated with a second transmission by another network entity, where modifying the at least one DMRS symbol of the first DMRS is further responsive to determining whether the at least one CRS pattern of the one or more CRS patterns overlaps with at least one DMRS symbol of the second DMRS.

In some implementations, the method can include modifying, by the network entity, at least one DMRS symbol of the second DMRS responsive to determining that at least one CRS pattern of the one or more CRS patterns overlaps with the at least one DMRS symbol of the first DMRS or the at least one DMRS symbol of the second DMRS.

Another innovative aspect of the subject matter described in this disclosure can be implemented in a method of wireless communication. The method includes receiving, by a user equipment (UE), a configuration message including at least one list of cell specific reference signal (CRS) patterns for a component carrier, where a list of the at least one list is associated with a control resource set (CORESET) group. The method also includes receiving, by the UE, a first message scheduling a first transmission, and receiving, by the UE, a second message scheduling a second transmission. The first transmission is associated with a first demodulation reference signal (DMRS) and is for the component carrier, and the second transmission is associated with a second DMRS and is for the component carrier. The method further includes modifying, by the UE, at least one DMRS symbol of the first DMRS or at least one DMRS symbol of the second DMRS based on the list being configured for the component carrier.

In some implementations, the first transmission is associated with the CORESET group, and the second transmission is associated with a second CORESET group.

In some implementations, determining that the at least one list is configured for DMRS shifting indicates that one or more CRS patterns overlap with the first DMRS or the second DMRS.

In some implementations, the method can include determining, by the UE, whether one or more CRS patterns of the at least one list overlaps with the first DMRS or the second DMRS, and where modifying the at least one DMRS symbol of the first DMRS or the at least one DMRS symbol of the second DMRS is further responsive to determining that at least one CRS pattern of the one or more CRS patterns overlaps with at least one DMRS symbol of the first DMRS or the second DMRS.

In some implementations, the at least one list of CRS patterns being configured for the component carrier enables DMRS shifting, rate matching, or both.

In some implementations, modifying the at least one DMRS symbol of the first DMRS or the at least one DMRS symbol of the second DMRS can include modifying the at least one DMRS symbol of the first DMRS and the at least one DMRS symbol of the second DMRS.

In some implementations, the method can include receiving, by the UE, the first transmission, the first transmission having modified DMRS symbols.

In some implementations, the method can include receiving, by the UE, the first transmission, the first transmission having modified DMRS symbols.

Another innovative aspect of the subject matter described in this disclosure can be implemented in an apparatus for wireless communication. The apparatus includes at least one processor and a memory coupled to the at least one processor. The at least one processor is configured to receive a configuration message including at least one list of cell specific reference signal (CRS) patterns for a component carrier, where a list of the at least one list is associated with a control resource set (CORESET) group. The processor is also configured to receive a first message scheduling a first transmission, and to receive a second message scheduling a second transmission. The first transmission is associated with a first demodulation reference signal (DMRS) and is for the component carrier, and the second transmission is associated with a second DMRS and is for the component carrier. The processor is further configured to modify at least one DMRS symbol of the first DMRS or at least one DMRS symbol of the second DMRS based on the list being configured for the component carrier.

In some implementations, the apparatus is operating in a multiple downlink control information (DCI), multiple transmission reception point (TRP) mode.

In some implementations, a second CORESET group is associated with a second list of CRS patterns of the at least one list of CRS patterns.

In some implementations, the first message is received on a Physical Downlink Control Channel (PDCCH), and the first transmission is received on a Physical Downlink Shared Channel (PDSCH).

In some implementations, modifying the at least one DMRS symbol of the first DMRS or the second DMRS can include adjusting a location of the at least one DMRS symbol of the first DMRS.

In some implementations, modifying the at least one DMRS symbol of the first DMRS or the second DMRS can include: incrementing a location value of each DMRS symbol of the first DMRS of the first transmission by one; and incrementing a location value of each DMRS symbol of the second DMRS of the second transmission by one.

In some implementations, the apparatus performs DMRS shifting for multiple downlink control information (DCI), multiple transmission reception point (TRP) modes independent of CRS and TRP associations.

In some implementations, the apparatus performs DMRS shifting across multiple transmission reception points (TRPs), and the apparatus performs rate matching per TRP.

Another innovative aspect of the subject matter described in this disclosure can be implemented in a method of wireless communication. The method includes transmitting, by a network entity, a configuration message including at least one list of cell specific reference signal (CRS) patterns for a component carrier, where a list of the at least one list is associated with a control resource set (CORESET) group. The method also include transmitting, by the network entity, a first message scheduling a first transmission associated with a first demodulation reference signal (DMRS) and for the component carrier. The method includes transmitting, by the network entity, a second message scheduling a second transmission associated with a second DMRS and for the component carrier. The method further includes modifying, by the network entity, at least one DMRS symbol of the first DMRS or at least one DMRS symbol of the second DMRS responsive to determining that the list is configured for the component carrier.

In some implementations, the first transmission is associated with the CORESET group, and the second transmission is associated with a second CORESET group.

In some implementations, modifying the at least one DMRS symbol of the first DMRS or the at least one DMRS symbol of the second DMRS can include modifying the at least one DMRS symbol of the first DMRS and the at least one DMRS symbol of the second DMRS.

In some implementations, the method can include: transmitting, by the network entity, the first transmission with a modified DMRS symbol; transmitting, by the network entity, the second transmission with a modified DMRS symbol; or both.

In some implementations, a second CORESET group is associated with a second list of CRS patterns of the at least one list of CRS patterns.

In some implementations, the first message corresponds to downlink control information (DCI).

In some implementations, the first message is a periodic grant and corresponds to downlink control information (DCI) or a Radio Resource Control (RRC) message that is configured to schedule multiple transmissions including the first transmission.

Another innovative aspect of the subject matter described in this disclosure can be implemented in an apparatus for wireless communication. The apparatus includes at least one processor and a memory coupled to the at least one processor. The at least one processor is configured to transmit a configuration message including at least one list of cell specific reference signal (CRS) patterns for a component carrier, where a list of the at least one list is associated with a control resource set (CORESET) group. The at least one processor is also configured to transmit a first message scheduling a first transmission associated with a first demodulation reference signal (DMRS) and for the component carrier. The at least one processor is configured to transmit a second message scheduling a second transmission associated with a second DMRS and for the component carrier. The at least one processor is further configured to modify at least one DMRS symbol of the first DMRS or at least one DMRS symbol of the second DMRS responsive to determining that the list is configured for the component carrier.

In some implementations, modifying the at least one DMRS symbol of the first DMRS or the second DMRS can include adjusting a location of the at least one DMRS symbol of the first DMRS.

In some implementations, modifying the at least one DMRS symbol of the first DMRS or the second DMRS can include: incrementing a location value of each DMRS symbol of the first DMRS of the first transmission by one; and incrementing a location value of each DMRS symbol of the second DMRS of the second transmission by one.

In some implementations, first resources of the first transmission at least partially overlap with second resources of the second transmission in a time domain, a frequency domain, or both.

In some implementations, first resources of the first transmission are orthogonal to second resources of the second transmission in a time domain, a frequency domain, or both.

In some implementations, first resources of the first transmission do not overlap with second resources of the second transmission in a time domain, a frequency domain, or both.

In some implementations, the first message corresponds to the CORESET group, the second message corresponds to a second CORESET group, and the CORESET groups are indicated by higher level signaling.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 7A-7C are block diagrams illustrating an example of DMRS modifications for a single PDSCH.

FIGS. 8A-8C are block diagrams illustrating an example of DMRS modifications for multiple PDSCHs.

FIG. 9 is a block diagram illustrating example blocks executed by a UE.

FIG. 10 is a block diagram illustrating example blocks executed by a network entity.

Like reference numbers and designations in the various drawings indicate like elements.

DETAILED DESCRIPTION

Figure 1:
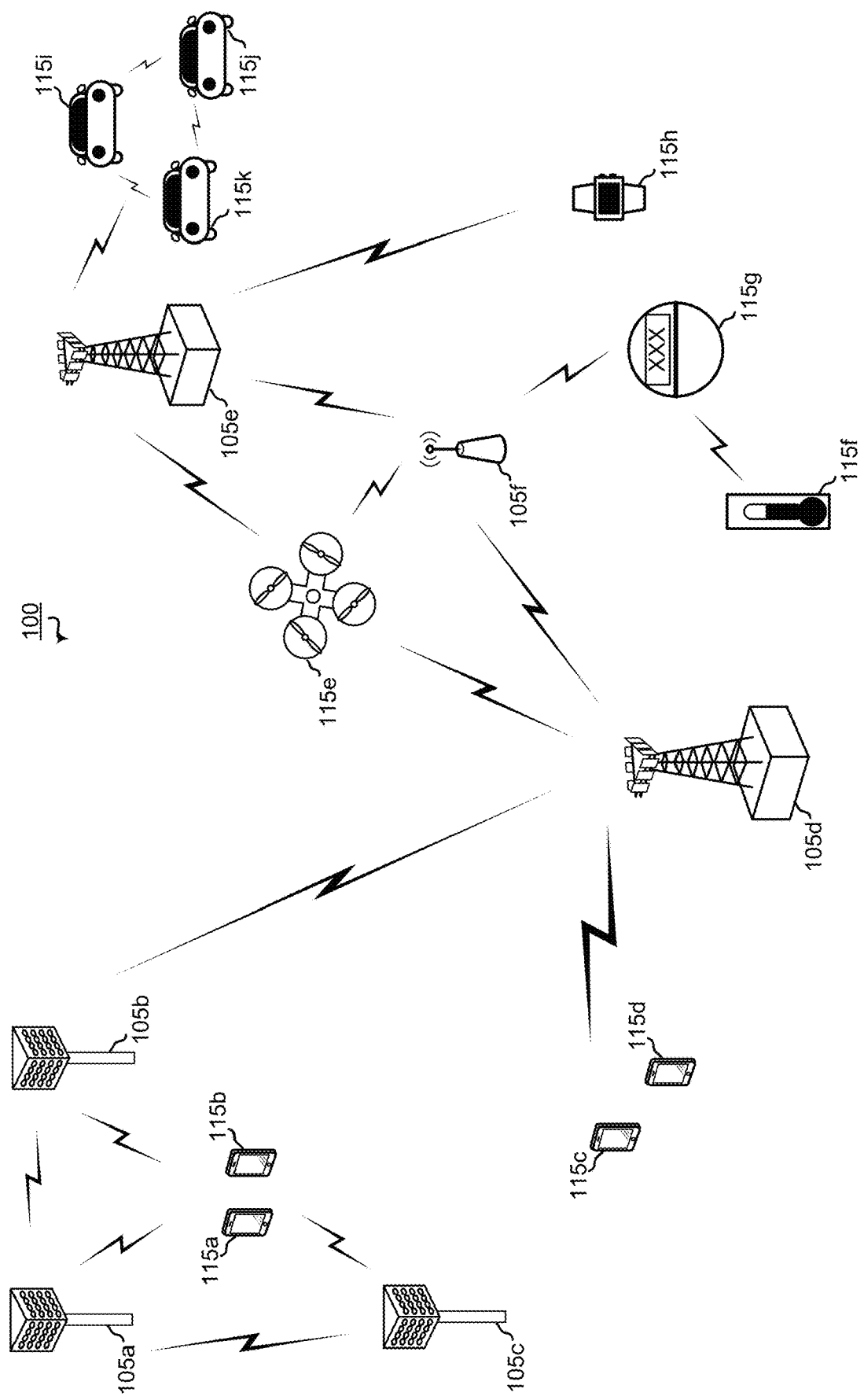
FIG. 1 is a block diagram illustrating details of an example wireless communication system.

The following description is directed to certain implementations for the purposes of describing the innovative aspects of this disclosure. However, a person having ordinary skill in the art will readily recognize that the teachings herein can be applied in a multitude of different ways.

Wireless communications systems operated by different network entities may share spectrum. In some instances, two network entities may be configured to send transmissions to multiple user equipments (UE). Thus, in order to enable network entities to use more of the shared spectrum, and in order to mitigate interfering communications between the different network entities, certain resources may be shifted to avoid collisions and interference with an effort to enable successful reception and decoding.

For example, when a network entity and UE are operating in a single transmission reception point (TRP) mode, there are some cases where a demodulation reference signal (DMRS) is shifted to avoid collisions with a cell-specific reference signal (CRS) pattern or with reserved resources of a control resource set (CORESET). In other words, a location of the DMRS symbols may be shifted due to collisions with other resources.

However, when operating in multiple TRP modes, conventional networks and devices are unable to perform DMRS shifting. For example, when the two transmissions are at least partially overlapping, if the DMRS location for one of the transmissions is shifted due to collision of a corresponding CRS pattern, the alignment of the transmissions may be altered. If DMRS symbols of overlapping transmissions are not aligned, interference may occur to the DMRS symbols, or the UE may not be able to receive and decode one or more of the transmissions due to poor channel estimation performance. On the other hand, if alignment of the DMRS symbols of overlapping transmissions is ensured, and the DMRS ports of the overlapping transmissions are separate and belong to different code division multiplexing (CDM) groups, the actual DMRS resource elements (REs) become orthogonal in the frequency domain, which enhances the channel estimation performance. Thus, the implementations described herein enable procedures for performing DMRS shifting in multiple TRP modes. Such shifting may enable the alignment of the DMRS locations for both transmissions to enable reception and decoding of the transmissions by the UE. For example, the DMRS symbols of both transmissions may be shifted responsive to determining an overlap for one of the transmissions. Thus, both of the transmissions may be DMRS shifted and remain aligned with each other.

Particular implementations of the subject matter described in this disclosure can be implemented to realize one or more of the following potential advantages. For example, by enabling DMRS shifting for multiple TRP modes, a network may send overlapping transmissions to increase bandwidth and reduce latency. Additionally, the network may be able to operate in multi-TRP modes for carrier aggregation or dual connectivity, such as by using multiple signaling, multiple TRP modes.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM).

3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS/GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes/km$^2$), ultra-low complexity (such as ~10 s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as 99.9999% reliability), ultra-low latency (such as ~1 millisecond (ms)), and users with wide ranges of mobility or lack thereof; and (3) with enhanced mobile broadband including extreme high capacity (such as ~10 Tbps/km$^2$), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to one of ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device to device or peer to peer or ad hoc network arrangements, etc.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (such as MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100 A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is reported to the network through the small cell base station 105f. The 5G network 100 may provide additional network efficiency through dynamic, low-latency TDD/FDD communications, such as in a vehicle-to-vehicle (V2V) mesh network between the UEs 115i-115k communicating with the macro base station 105e.

Figure 2:
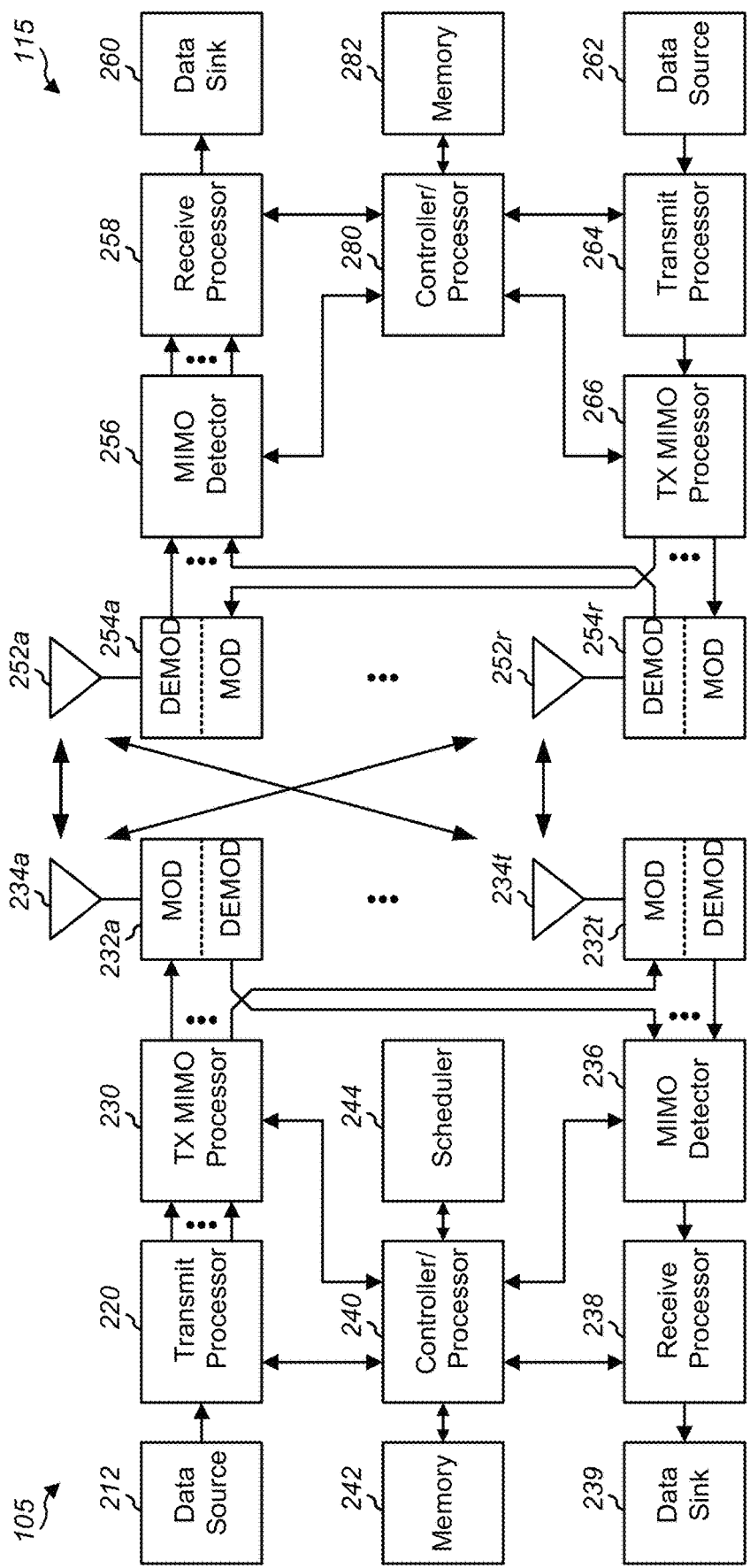
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, etc., to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, etc., to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller/processor 280. For example, to process the detected symbols, receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller/processor 280. Additionally, transmit processor 264 may generate reference symbols for a reference signal. The symbols from the transmit processor 264 may be precoded by TX MIMO processor 266 if applicable, further processed by the modulators 254a through 254r (such as for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to a data sink 239 and the decoded control information to controller/processor 240.

Controllers/processors 240 and 280 may direct the operation at base station 105 and UE 115, respectively. Controller/processor 240 or other processors and modules at base station 105 or controller/processor 280 or other processors and modules at UE 115 may perform or direct the execution of various processes for the techniques described herein, such as to perform or direct the execution illustrated in FIGS. 9 and 10, or other processes for the techniques described herein. Memories 242 and 282 may store data and program codes for base station 105 and UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities, such as network operators, are attempting to access a shared resource. In the 5G network 100, the base stations 105 and the UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
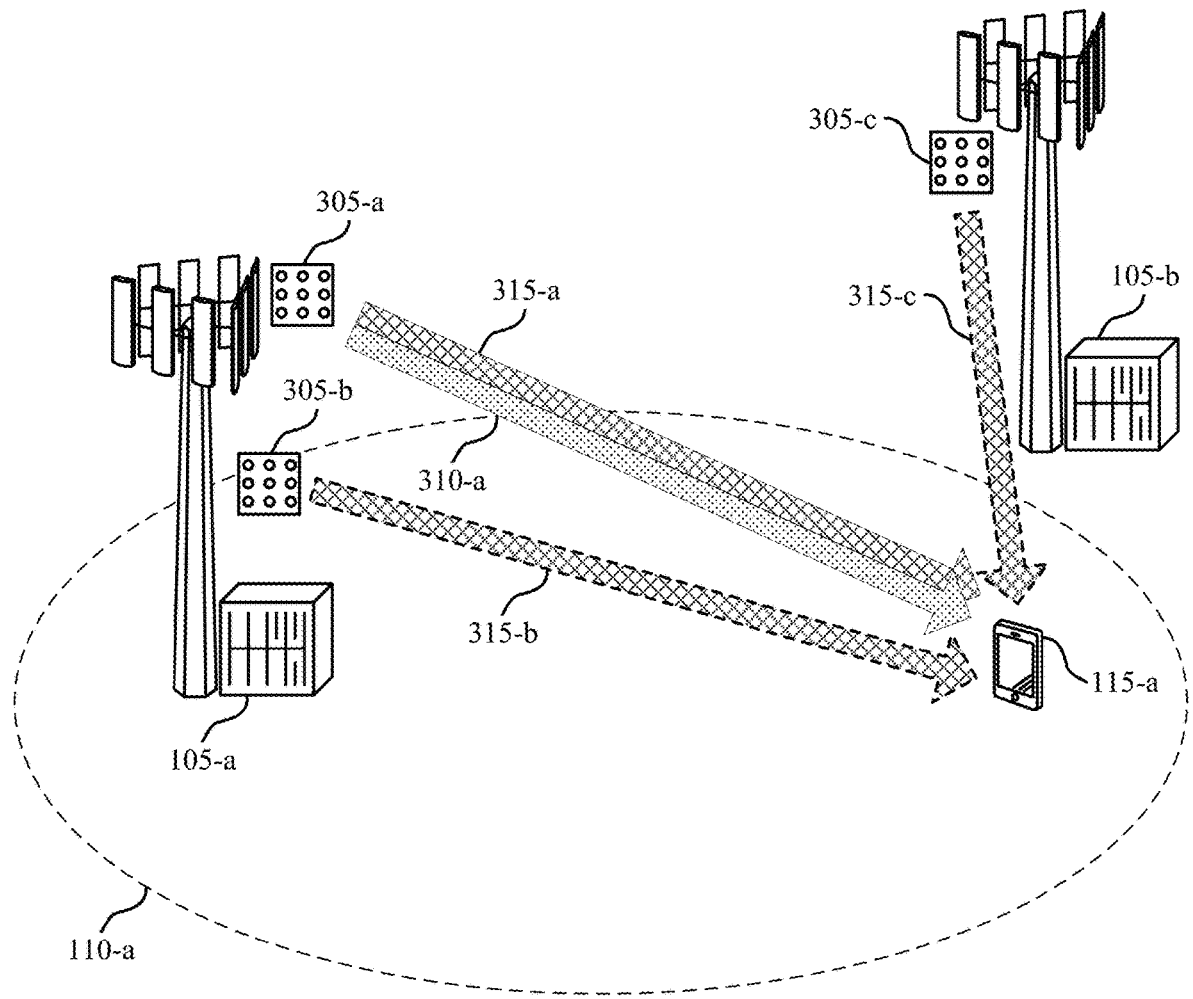
FIG. 3 is a diagram illustrating an example of a wireless communication system that operates in multi-transmission/reception point (TRP) schemes.

FIG. 3 illustrates an example of a wireless communications system 300 that supports different multi-TRP schemes. In some examples, wireless communications system 300 may implement aspects of wireless communication system 100. For example, wireless communications system 300 may include multiple UEs 115 and base stations 105. The base stations 105 may communicate with the UEs 115 using TRPs 305. Each base station 105 may have one or more TRPs 305. For example, base station 105-a may include TRP 305-a and TRP 305-b, while base station 105-b may include TRP 305-c. UE 115-a may communicate with the network using a single TRP 305, using multiple TRPs 305 corresponding to a single base station 105 (such as TRPs 305-a and 305-b at base station 105-a), or using multiple TRPs 305 corresponding to multiple different base stations 105 (such as TRP 305-a at base station 105-a and TRP 305-c at base station 105-b, where base stations 105-a and 105-b may be connected via a backhaul connection).

In a communication scheme that includes multiple TRPs 305, a single DCI message may configure the communications for the multiple TRPs 305. In an example, base station 105-a may communicate using a first TRP 305-a and a second TRP 305-b. Base station 105-a may transmit DCI using TRP 305-a on a PDCCH 310-a to UE 115-a. The DCI may include communication configuration information for the TCI state(s). The TCI state(s) may determine whether the communications correspond to single TRP communication or multiple TRP communication. The TCI state(s) also may indicate the type of communication scheme (such as TDM, FDM, SDM, etc.) configured for the communication. If the TCI configuration is one TCI state, the one TCI state may correspond to single TRP communication. If the TCI configuration is multiple TCI states, the multiple TCI states may correspond to communication with multiple TRPs. In some cases, the wireless communications system 300 may support up to M candidate TCI states for the purpose of quasi-co-location (QCL) indication. Of these M candidates (such as 128 candidate TCI states), a subset of TCI states may be determined based on a medium access control (MAC) control element (CE). The MAC-CE may correspond to a certain number (such as $2^N$, such as 8 TCI states) of candidate TCI states for PDSCH QCL indication. One of these $2^N$ TCI states can be dynamically indicated in a message (such as DCI) using N bits.

The DCI on the PDCCH 310-a may schedule PDSCH 315-a transmissions from TRP 305-a for single TRP communication configurations. Alternatively, the DCI on the PDCCH 310-a may schedule multiple PDSCH 315 transmissions from multiple TRPs 305. For example, the DCI may schedule PDSCH 315-a transmissions from TRP 305-a and PDSCH 315-b transmissions from TRP 305-b or PDSCH 315-a transmissions from TRP 305-a and PDSCH 315-c transmission from TRP 305-c for multiple TRP communication configurations. A UE 115 may be configured with a list of different candidate TCI states for the purpose of QCL indication. Each TCI code point in a DCI may correspond to one or more TCI states (such as corresponding to one or more reference signal (RS) sets for indicating the QCL relationships).

In cases where the network communicates with a UE 115 with TRPs 305, whether in a single TRP configuration or a multiple TRP configuration, there may be multiple different schemes with which to communicate with the TRP(s) 305. The TRP communication scheme may be determined by the TCI states. The TCI state(s) for communication on the PDSCH 315 may be indicated in the DCI by one or more bits, where the one or more bits indicate a TCI code point. The TCI code point in the DCI can correspond to one or more TCI states (such as either one or two TCI states). If the TCI code point in the DCI indicates one TCI state, the UE 115 is configured for single TRP operation. If the TCI code point in the DCI indicates two TCI states (and, correspondingly, two QCL relationships), the UE 115 is configured for multiple TRP operation. For example, if two TCI states are indicated within a TCI code point, each TCI state may correspond to one DMRS code division multiplexing (CDM) group.

In a first example multi-TRP scheme, TRPs 305 may communicate by utilizing SDM. In this case, different spatial layers may be transmitted from different TRPs 305 on the same RBs and symbols. Each TCI state also may correspond to different DMRS port groups. The DMRS ports in a DMRS CDM port group may be quasi-collocated (QCLed). This may allow a UE 115 to estimate each channel separately. In SDM, each antenna port used on the downlink may belong to a different CDM group. Base station 105-a may indicate the antenna port groups using an antenna port(s) field in DCI.

The SDM scheme may include different TCI states within a single slot, where the TCI states overlap in time, frequency, or both. Different groups of spatial layers (which may correspond to different TCI states) may use the same modulation order. Cases where multiple groups use the same modulation order may be signaled through the modulation and coding scheme (MCS). In some cases, base station 105-a may indicate the MCS in the DCI. In cases where the different groups of spatial layers use different modulation orders, each of the different modulation orders may be signaled to UE 115-a. Different DMRS port groups may correspond to different TRPs, QCL relationships, TCI states, or a combination thereof.

In other examples of multi-TRP schemes, TRPs 305 may communicate with UE 115-a by utilizing FDM or TDM communication schemes. In an FDM scheme, one set of RBs or a set of PRGs may correspond to a first TRP 305-a and a first TCI state, and a second set of RBs or PRGs may correspond to a second TRP 305-b and a second TCI state. The RBs allocated for each TRP may be distinct from each other, so that each TRP communicates on a designated set of RBs that are distinct form the other set of RBs (but may overlap in the same OFDM symbol). The frequency domain resource assignment field in the DCI may indicate both the first set and the second set or RBs or PRGs. In some cases, base station 105-a may use additional signaling in the DCI to indicate which RBs belong to the first set and which belong to the second set. In some cases, the system may support a limited number of possibilities for allocating the frequency resources to the different TRPs (such as to reduce the overhead).

In a TDM scheme, a similar table of possibilities may be used to signal the resource allocation for different TRPs. In this case, each TRP is allocated to different sets of OFDM symbols rather than to different sets of RBs. Such a TDM scheme may support TDMed transmissions within a single slot (such as transmission time interval (TTI)). In some cases, a TDM scheme may implement slot aggregation, where transmissions using different TCI states may be spread across different slots (such as TTIs). In slot aggregation, the transmissions over the different TRPs may use separate rate matching, but may have the same or different modulation orders.

The network may communicate with UE 115-a using multiple TRPs and any of the communication schemes described herein. Further, some communication schemes may include a combination of TDM and FDM, or cases where TDM may or may not be in a slot aggregation configuration. The schemes also may include some cases where rate matching is joint and some cases where rate matching is separate for different TRPs, and the schemes also may include cases where the different TRPs have the same or different modulation orders. Each scheme also may utilize different parameters that are included in signaling, such as which DMRS ports are used (such as for an SDM scheme) or how RBs are split up (such as for an FDM scheme).

To efficiently configure UE 115-a with the TCI state information—and the corresponding TRP scheme—base station 105-a may generate bits for a DCI message and may transmit the DCI on PDCCH 310-a. The DCI message may be transmitted to UE 115-a using TRP 305-a. UE 115-a may determine which scheme is configured for communication with TRPs 305 based on one or more fields of the received DCI. The DCI may be the same size across all communication schemes, and the formatting (such as a number of bits) of DCI fields may remain the same across the communication schemes.

Figure 4:
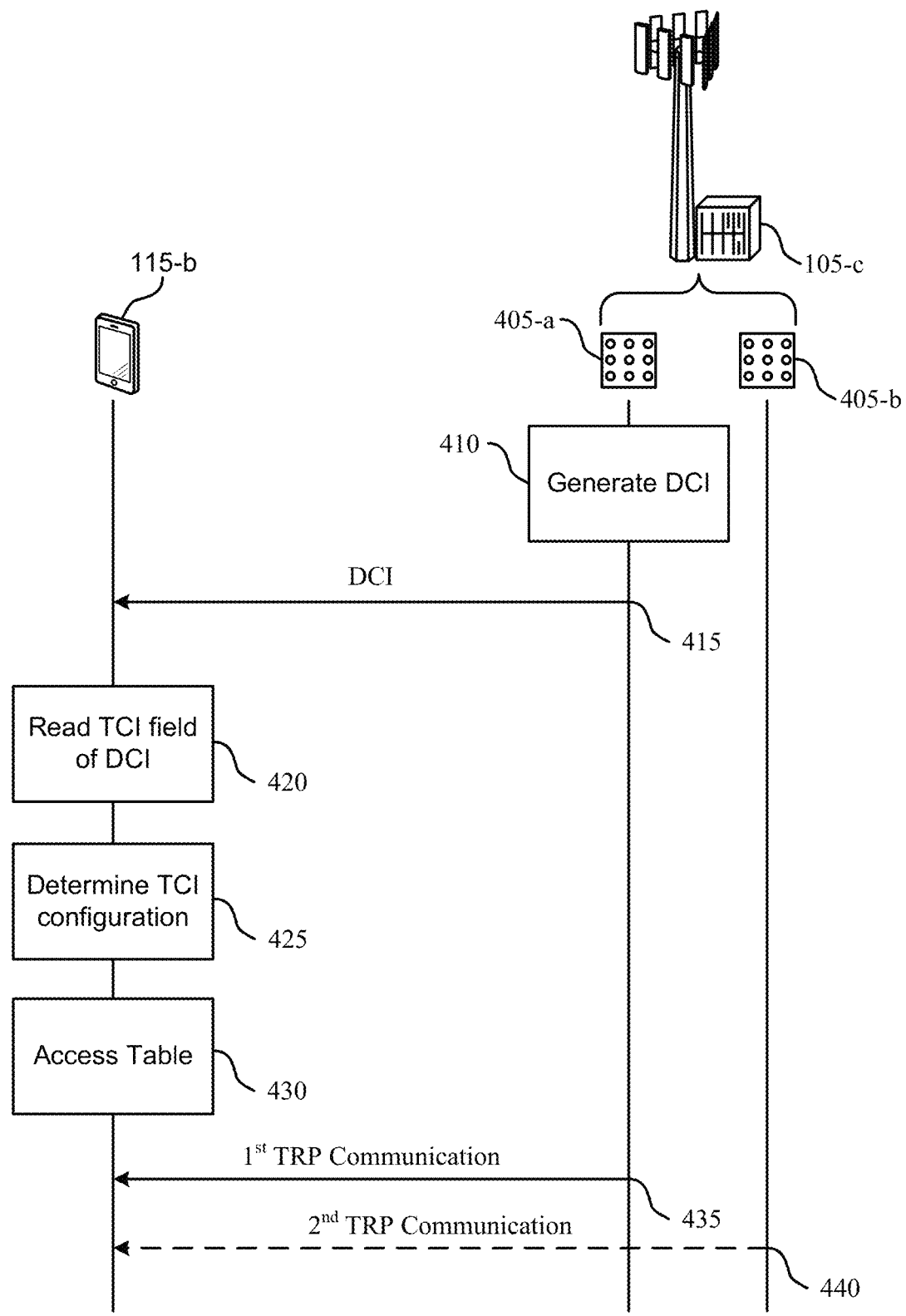
FIG. 4 is a block diagram illustrating an example of a process flow for different multi-TRP schemes.

FIG. 4 is a block diagram illustrating an example of a process flow for different multi-TRP schemes. FIG. 4 illustrates an example of a process flow 400 that supports different multi-TRP schemes. In some examples, process flow 400 may implement aspects of a wireless communications system 100 or 300. For example, a base station 105 and UE 115, such as base station 105-c and UE 115-b, may perform one or more of the processes described with reference to process flow 400. Base station 105-c may communicate with UE 115-b by transmitting and receiving signals through TRPs 405-a and 405-b. In other cases, TRPs 405-a and 405-b may correspond to different base stations 105.

Alternative examples of the following may be implemented, where some steps are performed in a different order than described or are not performed at all. In some cases, steps may include additional features not mentioned below, or further steps may be added.

At 410, base station 105-c may generate DCI. The generation may include generating a first set of bits (such as a TCI field) that may indicate a set of TCI states for communication with UE 115-b. The generation also may include generating a second set of bits (such as an antenna port(s) field) that may indicate a set of antenna ports and, in some cases, a multi-TRP communication scheme for multiple TRP communication operation. In some cases, the second set of bits may additionally indicate a modulation order for at least one TCI state (such as a second TCI state for TRP 405-b), an RV for a TB for at least one TCI state (such as the second TCI state for TRP 405-b), or a combination thereof.

At 415, base station 105-c may transmit the generated DCI to UE 115-b. UE 115-b may receive the DCI from base station 105-c. The DCI may be transmitted on a PDCCH from TRP 405-a. The DCI may schedule upcoming PDSCH transmissions and may include other control information. The DCI may include an indication of the first set of bits and the second set of bits. For example, the DCI may include coded bits based on the first set of bits and the second set of bits.

At 420, UE 115-b may read the TCI field (such as the first set of bits) received in the DCI message. UE 115-b may identify, using the first set of bits, one or more TCI states for communication with base station 105-c using one or more TRPs 405.

At 425, UE 115-b may determine the TCI state configuration based on reading the TCI field of the DCI. For example, a value (such as tci-PresentInDCI) in the TCI field may not be configured for the CORESET scheduling the PDSCH, or the value may correspond to one TCI state. In these cases, the communication scheme may be configured for one TRP. In other cases, the TCI field value may correspond to more than one TCI state. In these other cases, the communication may be configured for communication with multiple TRPs.

UE 115-b may read the antenna port(s) field of the DCI and may interpret the value of the field based on the determined TCI state configuration. For example, if UE 115-b determines that the TCI field indicates a single TCI state, UE 115-b may identify, using the second set of bits, a set of antenna ports for the PDSCH transmission. At 430, UE 115-b may access a table (such as pre-configured in memory or configured by the network) to determine one or more antenna ports corresponding to the antenna port(s) field value.

Alternatively, if UE 115-b determines that the TCI field indicates multiple TCI states, UE 115-b may identify, using the second set of bits, a set of antenna ports and a multi-TRP communication scheme based on identifying the set of TCI states. The second set of bits may include the same number of bits whether the field indicates just the set of antenna ports for single TRP operation or the set of antenna ports and the multi-TRP scheme for multi-TRP operation. At 430, UE 115-b may access a lookup table to determine the set of antenna ports and multi-TRP scheme based on the antenna port(s) field value. In some cases, UE 115-b may select the lookup table from a set of lookup tables, where the set may include one lookup table to use for single TRP operation and one lookup table to use for multiple TRP operation.

The lookup table may include information mapping both the set of antenna ports and the multiple TRP scheme to the second set of bits. In some cases, the lookup table mapping both the set of antenna ports and the multiple TRP communication scheme to the second set of bits may be preconfigured in memory, and in some cases it may be dynamically configured by base station 105-c. UE 115-b may identify the second set of antenna ports and multiple TRP schemes based on the selected lookup table. In the lookup table for multi-TRP operation, along with indications of the DMRS ports, the table may include indications of the multiple TRP scheme (such as SDM, FDM, TDM, or some combination thereof). The antenna port(s) field lookup table may indicate that a value in the antenna port(s) field of the DCI corresponds to a set of DMRS ports, where the set of DMRS ports further corresponds to a communication scheme, such as SDM or FDM. The antenna port(s) field value also may indicate if rate matching is joint or separate. If the antenna port(s) field value indicates the use of an FDM communication scheme, the table may additionally indicate an RB configuration for the FDMed TCI states, as shown in the "Possibility" column of the table below. If the lookup tables are configurable by the network, the network may define the sets of possible DMRS ports and the type of schemes using radio resource control (RRC) signaling.

In some cases, UE 115-b may identify, using the second set of bits, a modulation order for at least one TCI state of the set of possible TCI states. Different modulation orders also may be used across different TCI states. A first modulation order may be indicated in a modulation order field. The first modulation order may correspond to a first TCI state in a multi-TRP operation. A second modulation order may be indicated in one of the tables above based on the received value for the antenna port(s) field. For example, a column in the antenna port(s) field lookup table may indicates if the modulation order corresponding to the second TCI state is the same as the modulation order indicated in the MCS (i.e., the modulation order for the first TCI state). If the modulation order is not the same as the modulation order indicated in the MCS, the value of the modulation order for the second TCI state may be indicated in the antenna port(s) field. The value of the modulation order may be an absolute value or may be a relative value with respect to the first modulation order.

If the TCI state configuration is determined to indicate communication with a single TRP, UE 115-b may receive a transmission from one TRP 405-a at 435. UE 115-b may communicate with the single TRP 405-a based on the determined communication scheme.

If the TCI state configuration is determined to indicate communication with multiple TRPs 405, UE 115-b may receive a transmission from one TRP 405-a at 435 and also may receive a transmission from another TRP 405-b at 440 (where, in some cases, 435 and 440 may correspond to a same time or OFDM symbol). UE 115-b may communicate with the network via the multiple configured TRPs 405 based on the determined communication scheme.

Systems and methods described herein are directed to DMRS modifications for multiple messaging and multiple TRP modes. The DMRS modifications may enable enhanced or improved operation in multi-TRP modes. In some implementations, the systems and methods described herein enable DMRS shifting in multiple DCI based multi-TRP modes. Accordingly, such systems and methods can be utilized for multiple TRP modes.

Figure 5B:
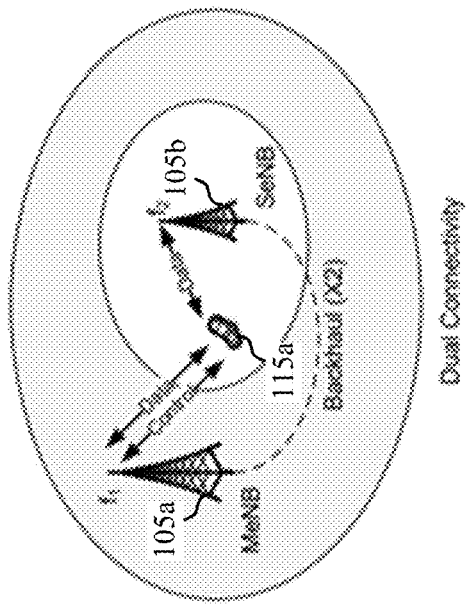
FIGS. 5A-5D are diagrams illustrating different example multi-TRP schemes.
Figure 5D:
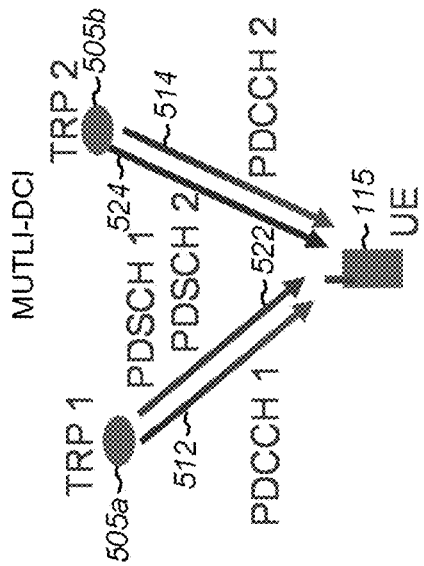
Figure 5A:
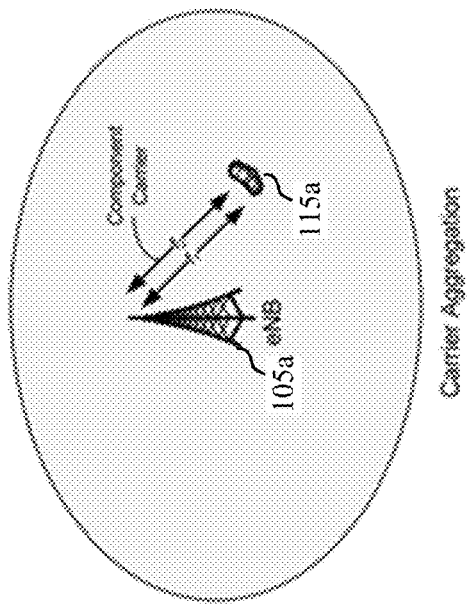

FIGS. 5A-5D are diagrams illustrating different example multi-TRP schemes. Referring to FIGS. 5A-5D, examples of diagrams for different multiple TRP modes are illustrated. In FIG. 5A, a diagram illustrating carrier aggregation is illustrated. FIG. 5A depicts one base station 105a which communicates with UE 115a. Base station 105a may transmit data and control information; base station 105 may transmit (and receive) information using different equipment or settings (such as different frequencies). In FIG. 5B, a diagram illustrating dual connectivity is illustrated. FIG. 5B depicts two base stations, 105a and 105b which communicate with UE 115a. UE 115a communicates data with both base stations and control information with one base station, main base station 105a.

Figure 5C:
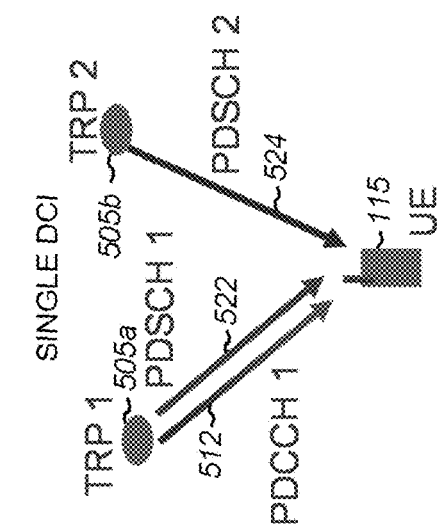

FIGS. 5C and 5D depict DCI based operations for multiple TRP modes. FIG. 5C depicts a single DCI operation mode, and FIG. 5D depicts a multiple DCI operation mode. In FIGS. 5C and 5D, a system includes a first TRP 505a, a second TRP 505b, and a UE 115. The second TRP 505b may be included with the first TRP 505a (such as two TRPs of first base station 105a of FIG. 5A) or may be separate from the first TRP 505a (such as a TRP from each of first and second base stations 105a and 105b of FIG. 5B). In FIG. 5C, the first TRP 505a transmits downlink control information or DCIs, as illustrated by first PDCCH 512. In FIG. 5C, the first PDCCH 512 schedules two PDSCHs, first PDSCH 522 and second PDSCH 524.

Conversely, in FIG. 5D, both the first TRP 505a and the second TRP 505b transmit a DCI, as illustrated by PDCCHs 512 and 514. Each PDCCH 512 and 514 schedules a corresponding PDSCH, PDSCHs 522, 524. The PDSCH resources can be overlapping, partially overlapping, or non-overlapping. For the PDCCHs 512 and 515, different CORESETs or CORESET groups may be used for the two TRPs 505a and 505b (i.e., a first CORESET group for first transmissions for the first TRP 505a and a second CORESET group for second transmissions for the second TRP 505b). Each CORESET or CORESET group may have a different TCI state.

The CORESET groups may or may not be indicated to the UE. For example, when signaled to the UE, the CORESET groups may be indicated by higher layer signaling. The CORESET group information may be used for DMRS modifications, CRS rate matching, or both. As another example, when not signaled, the UE may be unaware of the CORESET groups and may not utilize the CORESET group data for DMRS modifications, CRS rate matching, or both.

Figure 6:
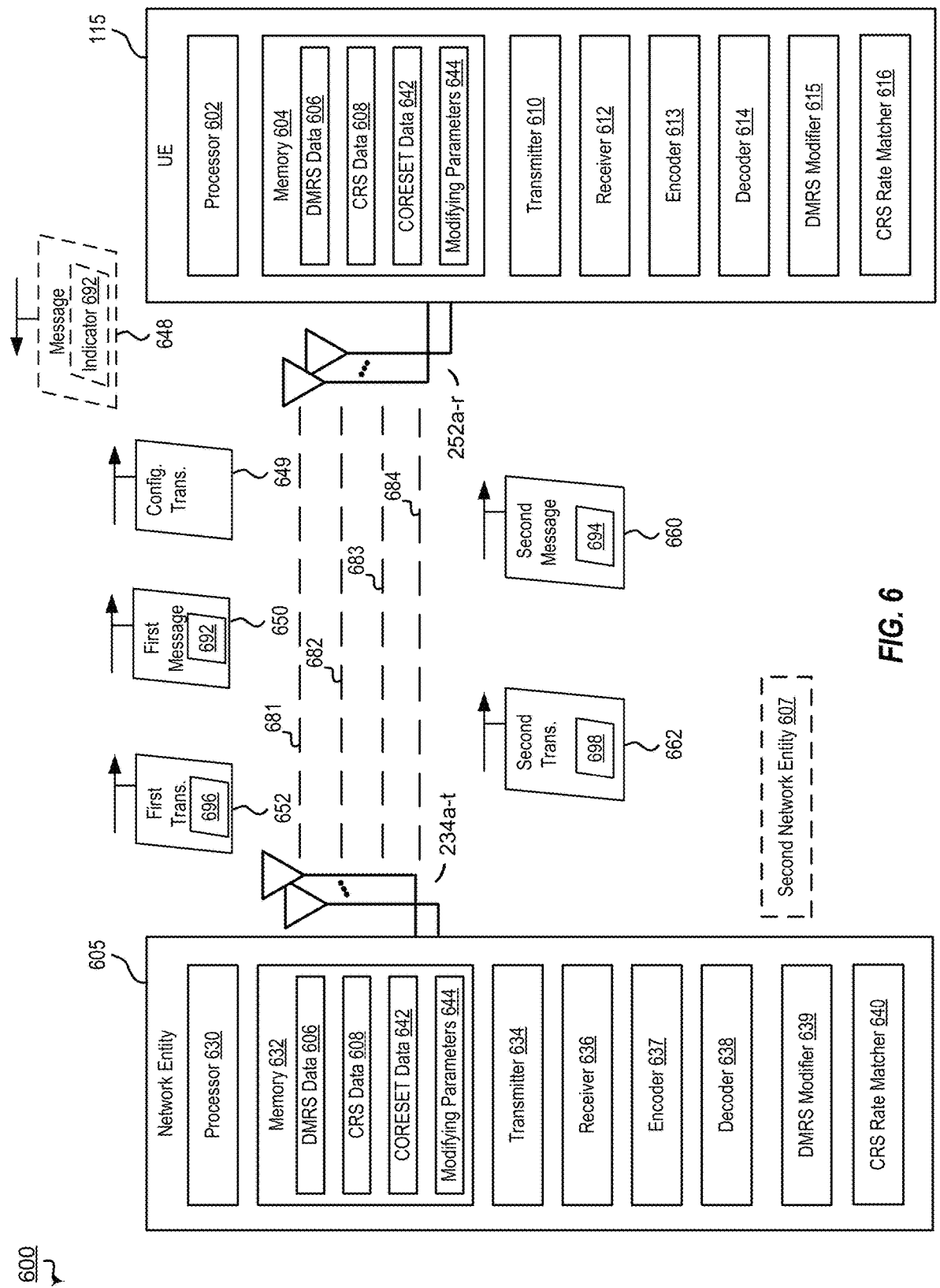
FIG. 6 is a block diagram illustrating an example of a wireless communications system that enables DMRS modifications.

FIG. 6 is a block diagram illustrating an example of a wireless communications system that enables DMRS modifications. FIG. 6 illustrates an example of a wireless communications system 600 that supports DMRS modifications. In some examples, wireless communications system 600 may implement aspects of wireless communication system 100. For example, wireless communications system 600 may include network entity 605 (such as base station 105), UE 115, and optionally second network entity 607 (such as second base station 105 or a second TRP of base station 105). DMRS modification operations may enable multi-DCI based multi-TRP operations and operation with other types of networks, such as LTE. Operating on multiple networks and bandwidth may enable increased throughput and reliability and reduced latency.

Network entity 605 and UE 115 may be configured to communicate via frequency bands, such as FR1 having a frequency of 410 to 7125 MHz or FR2 having a frequency of 24250 to 52600 MHz for mm-Wave. It is noted that sub-carrier spacing (SCS) may be equal to 15, 30, 60, or 120 kHz for some data channels. Network entity 605 and UE 115 may be configured to communicate via one or more component carriers (CCs), such as representative first CC 681, second CC 682, third CC 683, and fourth CC 684. Although four CCs are shown, this is for illustration only, as more or fewer than four CCs may be used. One or more CCs may be used to communicate a Physical Downlink Control Channel (PDCCH), a Physical Downlink Shared Channel (PDSCH), a Physical Uplink Control Channel (PUCCH), or a Physical Uplink Shared Channel (PUSCH). In some implementations, such transmissions may be scheduled by dynamic grants. In some other implementations, such transmissions may be scheduled by one or more periodic grants and may correspond to semi-persistent scheduling (SPS) grants or configured grants of the one or more periodic grants.

Each periodic grant may have a corresponding configuration, such as configuration parameters/settings. The periodic grant configuration may include SPS configurations and settings. Additionally, or alternatively, one or more periodic grants (such as SPS grants thereof) may have or be assigned to a CC ID, such as intended CC ID.

Each CC may have a corresponding configuration, such as configuration parameters/settings. The configuration may include bandwidth, bandwidth part, hybrid automatic repeat request (HARQ) process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC also may have corresponding management functionalities, such as, beam management, BWP switching functionality, or both. In some implementations, two or more CCs are quasi co-located, such that the CCs have the same beam or same symbol.

In some implementations, control information may be communicated via network entity 605 and UE 115. For example, the control information may be communicated suing MAC-CE transmissions, RRC transmissions, DCI, transmissions, another transmission, or a combination thereof.

UE 115 includes processor 602, memory 604, transmitter 610, receiver 612, encoder, 613, decoder 614, DMRS modifier 615, CRS rate matcher 616, and antennas 252a-r. Processor 602 may be configured to execute instructions stored at memory 604 to perform the operations described herein. In some implementations, processor 602 includes or corresponds to controller/processor 280, and memory 604 includes or corresponds to memory 282. Memory 604 also may be configured to store DMRS data 606, CRS data 608, CORESET groups data 642, modification parameter data 644, or a combination thereof, as further described herein.

The DMRS data 606 corresponds to DMRS data of or associated with the network entity 605, the second network entity 607, or both. To illustrate, DMRS data 606 may include DMRS symbols for transmissions, such as PDSCH transmissions, and locations of the DMRS symbols in the transmissions. The CRS data 608 includes or corresponds to CRS data of or associated with the network entity 605, the second network entity 607, or both. To illustrate, CRS data 608 may include timing and location data for CRS data, often referred to as a CRS pattern. The CRS data 608 may include or indicate one or more CRS patterns, and may include or correspond to a CRS pattern parameter, such as lte-CRS-ToMatchAround. Some CRS pattern parameters, may include or be associated with multiple CRS patterns, (thus such CRS pattern parameters are known and referred to in the art as a list of CRS patterns). Such CRS pattern parameters (including lists) are known in the art as being associated with a particular component carrier as they are configured per component carrier.

The CORESET groups data 642 includes or corresponds to data which associates or links a network entity, such as a base station, cell, or TRP thereof, and optionally transmissions thereof, to a particular DMRS, a particular CRS pattern, or both. The CORESET groups data 642 may be indicated by higher layer signaling, such as RRC signaling (such as a configuration message). Alternatively, only the network entities include such association data, and the UE is unaware of such associations. In such implementations, the UE may perform DMRS modifications (such as shifting), CRS rate matching, or both independent of network entity associations.

The modification parameter data 644 includes or corresponds to data which is used by UE 115 to modify DMRS data 606, such as configured to modify DMRS data 606 to generate modified DMRS data, such as 696, 698. The DMRS data 606 may further include modified DMRS data (696, 698) of or associated with the network entity 605, the second network entity 607, or both. To illustrate, DMRS data 606 may include modified locations of the DMRS symbols in the transmissions.

Transmitter 610 is configured to transmit data to one or more other devices, and receiver 612 is configured to receive data from one or more other devices. For example, transmitter 610 may transmit data, and receiver 612 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 610 and receiver 612 may be replaced with a transceiver. Additionally, or alternatively, transmitter 610, receiver, 612, or both may include or correspond to one or more components of UE 115 described with reference to FIG. 2.

Encoder 613 and decoder 614 may be configured to encode and decode, such as encode or decode transmissions with modified DMRS locations, respectively. DMRS modifier 615 may be configured to perform DMRS modification. For example, DMRS modifier 615 is configured to modify a location of one or more DMRS symbols for a encoding or decoding transmission. To illustrate, responsive to determining collision or overlap with a CRS resource, a partial or full overlap with a second transmission, or both, the DMRS modifier 615 adjusts a location of the overlapping DMRS symbol. In some implementations, the DMRS modifier 615 adjusts, such as increments or decrements, the location of each DMRS symbol of each transmission, that is the DMRS symbols of the first and second transmissions.

CRS rate matcher 616 may be configured to perform CRS rate matching of a transmission (such as the first PDSCH transmitted from the first TRP associated with the first value of higher index or the first PDSCH transmitted from the first TRP associated with the first value of higher index) around a particular LTE CRS or LTE CRS pattern. Such rate matching procedures enable coexistence of NR and LTE as the data transmission of NR (such as the first PDSCH or the second PDSCH) is rate matched around one or more LTE CRS pattern(s).

Network entity 605 includes processor 630, memory 632, transmitter 634, receiver 636, encoder 637, decoder 638, DMRS modifier 639, CRS rate matcher 640, and antennas 234*a*-*t*. Processor 630 may be configured to execute instructions stores at memory 632 to perform the operations described herein. In some implementations, processor 630 includes or corresponds to controller/processor 240, and memory 632 includes or corresponds to memory 242. Memory 632 may be configured to store DMRS data 606, CRS data 608, CORESET group data 642, modifying parameters 644, or a combination thereof, similar to the UE 115 and as further described herein.

Transmitter 634 is configured to transmit data to one or more other devices, and receiver 636 is configured to receive data from one or more other devices. For example, transmitter 634 may transmit data, and receiver 636 may receive data, via a network, such as a wired network, a wireless network, or a combination thereof. For example, network entity 605 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 634 and receiver 636 may be replaced with a transceiver. Additionally, or alternatively, transmitter 634, receiver, 636, or both may include or correspond to one or more components of network entity 605 described with reference to FIG. 2. Encoder 637, and decoder 638 may include the same functionality as described with reference to encoder 613 and decoder 614, respectively. DMRS modifier 639 and CRS rate matcher 640 may include the same functionality as described with reference to DMRS modifier 615 and CRS rate matcher 616, respectively.

During operation of wireless communications system 600, network entity 605 may determine that UE 115 has DMRS shifting capability for multiple TRP operating modes, such as multi-DCI, multi-TRP operating modes. For example, UE 115 may transmit a message 648, such as a capabilities message, that includes DMRS shifting indicator 672. Indicator 672 may indicate enhanced DMRS shifting capability or a particular type of DMRS shifting, such as by incrementing location values. In some implementations, network entity 605 sends control information to indicate to UE 115 that DMRS shifting capability for multiple TRP operating modes is to be used. For example, in some implementations, message 648 (or another message, such as response or trigger message) is transmitted by the network entity 605.

In the example of FIG. 6, network entity 605 transmits an optional a configuration transmission 649. The configuration transmission 649 may include or indicate a DMRS modification configuration, such as modifying parameters data 644. The configuration transmission 649 (such as 644 thereof) may indicate how to adjust a location of DMRS symbols or what type of DMRS shifting mode to operate in, such as per TRP, across all TRPs, independent of CRS rate matching, etc.

After transmission of the message 648 (such as a DMRS shifting configuration message, such as a RRC message or a DCI), transmissions may be scheduled by the network entity 605, the network entity 607, the UE 115, or both. Such scheduled transmissions may include shared channel transmissions, such as PDSCH or PUSCH. Such transmissions may be scheduled by dynamic grant or by periodic grant.

The periodic grants are configured to schedule one or more SPS grants (such as PDSCHs).

In the example of FIG. 6, the network entity 605 transmits a first message 650 and optionally transmits a second message 660. For example, the network entity 605 is a base station that include multiple TRPs, and different TRPs transmit the messages 650, 660. In some other implementations, the second network entity 607 transmits the second message 660. For example, in such implementations, each of the network entities 605, 607 may include or correspond to a TRP of different panels or of different base stations.

First and second message 650, 660 may include or correspond to DCIs or RRC messages and may be sent via corresponding PDCCHs. The first message 650 and the second message 660 each schedule one or more corresponding downlink transmissions. In the example of FIG. 6, the first message 650 schedules first transmission 652 and the second message 660 schedules second transmission 662.

Each of the first message 650 and the second message 660 has or is associated with a corresponding DMRS for the corresponding downlink transmission or transmissions. In FIG. 6, these corresponding DMRSs include a first DMRS 692 of or associated with the first transmission 652 and a second DMRS 694 of or associated with the second transmission 662. In some implementations, the first DMRS 692 and the second DMRS 694 are similar. For example, they have the same number of DMRS symbols and the DMRS symbols are located in the symbol position or slot, referred to as symbol location.

Additionally, each of the first message 650 and the second message 660 has or is associated with a corresponding CRS. The CRS may be associated with the particular network entity that transmits the message, or may be associated with a particular value of the higher layer index configured per CORESET (i.e., associated with a CORESET group representing a TRP). To illustrate, each TRP may have an associated CRS pattern. Alternatively, a single CRS pattern may be used for multiple TRPs, such as multiple TRPs of a single base station or serving cell. When multiple CRS patterns are used, the UE 115, the network entity 605, the network entity 607, or a combination thereof, may generate a combined CRS pattern, such as a union of CRS patterns which includes each of the resources of the multiple CRS patterns.

After transmission of the first message 650, the second message 660, or both, the UE 115, the network entity 605, the network entity 607, or a combination thereof, may determine whether the one or more associated CRS patterns overlap the associated DMRS of the first message 650 or the second message 660. Although not illustrated in FIG. 6, the CRS patterns may be sent in messages 650, 660 or other messages, such as by RRC message or configuration.

To illustrate, the UE 115 may determine whether any resources of the one or more associated CRS patterns overlap any resources, such as DMRS symbols, of the first and second DMRS 692, 694 for the first and second transmissions 652, 662 indicated by messages 650, 660. Responsive to determining no overlap, the UE 115 may refrain from performing DMRS shifting. For example, the UE 115 may refrain from determining whether one or more CRS resource and DMRS symbols overlap. As another example, the UE 115 may refrain from modifying or not modify, such as shift, DMRS symbols even though the UE 115 determines that one or more CRS resource and DMRS symbols overlap.

Responsive to determining an overlap, the UE 115 may performing DMRS shifting. In some implementations, the above determination is only performed when the first transmission 662 and the second transmission 662 at least partially overlap in time, frequency, or both. In such implementations, the above determination is not performed when the first transmission 662 and the second transmission 662 do not overlap, such as when the resources thereof (such as resource blocks (RBs)) are orthogonal and the CRS pattern does not have an association with the first transmission, or optionally any transmission. Examples of overlapping include partial overlap of the first transmission 652 with the second transmission 662 in time, frequency, or both, or full overlap of the first transmission 652 with the second transmission 662 in time, frequency, or both. As an illustrative example, if the transmissions 652, 662 are frequency division multiplexed, they may be partially or fully overlapping in the time domain, such as by occupying at least one common ODFM symbol in orthogonal resource blocks.

The UE 115 and the network entity 605 or network entities 605 and 607 modify DMRS 692, 694 to generate modified DMRS 696, 698. The transmissions 652, 662 include the modified DMRS, that is DMRS 696 and 698, respectively.

Network entity 605 or network entities 605 and 607 may encode the transmissions 652, 662 to be transmitted, such as via the same serving cell (such as a same CC) or multiple serving cell (such as multiple CCs). For example, network entity 605 may transmit first transmission 652 via first CC 681 and may transmit second transmission 662 via second CC 682.

UE 115 receives the transmissions 652, 662 including the modified DMRS 696 and 698. For example, UE 115 decodes or processes the transmissions 652, 662 based on the modified DMRS 696 and 698. Based on the decoding of messages 650, 660, transmissions 652, 662, or both, UE 115 may send one or more acknowledgment messages (such as PUCCHs) to network entities 605, 607. It is noted that the acknowledgment message may include or correspond to a positive or negative acknowledgment, such as an ACK/NACK. UE 115 may send an ACK or a NACK based on a determination of whether the first transmission 652, the second transmission 662, or both, were successfully decoded. To illustrate, an ACK is communicated if decoding is successful and a NACK is communicated if decoding is unsuccessful.

Referring to FIGS. 7A-7C and 8A-8C, diagrams illustrating DMRS modifications are depicted. FIGS. 7A-7C are block diagrams illustrating an example of DMRS modifications for a single PDSCH. FIGS. 7A-7C corresponds to DMRS modifications for a single PDSCH, and FIGS. 8A-8C correspond to DMRS modifications for multiple PDSCHs. In FIGS. 7A-7C and 8A-8C, symbols of PDSCHs are illustrated with pattern filling.

Referring to FIG. 7A a block diagram illustrating an example DMRS pattern/scheme is illustrated. FIG. 7A depicts an example of a DMRS pattern for a PDSCH, such as a portion thereof. The PDSCH, such as the portion of the PDSCH, includes 10 symbols in the example of FIG. 7A. The 10 symbols may be used for DMRS and data, such as DMRS symbols and data symbols. As illustrated in FIG. 7A, the DMRS of the PDSCH includes four DMRS symbols and six data symbols. The four DMRS symbols are located at symbols 1, 5, and 8 of the PDSCH, when the numbering starts from 1.

Referring to FIG. 7B, a block diagram illustrating an example CRS pattern/scheme is illustrated. FIG. 7B depicts an example of a CRS pattern. Similar to FIG. 7B, the PDSCH includes 10 symbols in the example of FIG. 7B. All or a portion of the symbols of the PDSCH may be used for CRS, such as for CRS rate matching, and may correspond to CRS blocks. As illustrated in FIG. 7B, the CRS includes or occupies four symbols. The four symbols are located at symbols 1, 4, 5, and 8 of the PDSCH, when the numbering starts from 1.

Referring to FIG. 7C, a block diagram illustrating an example DMRS modification is illustrated. FIG. 7C illustrates DMRS shifting by modifying of a location of one or more DMRS symbols of a transmission, such as PDSCH.

In FIG. 7C, a single PDSCH is illustrated. The PDSCH has the DMRS pattern or scheme as illustrated in FIG. 7A. Additionally, the PDSCH has or is associated with the CRS pattern or scheme illustrated in FIG. 7B. As illustrated in FIG. 7C, multiple DMRS symbols, locations thereof, may overlap with the CRS blocks of the CRS pattern illustrated in FIG. 7B. Specifically, each of the DMRS symbols (1, 4, and 8) overlap with the CRS resources/symbols of the CRS pattern. Accordingly, each DMRS symbol of each PDSCH is modified based on the overlap of one or more DMRS symbols and CRS blocks/locations.

For example, a location of each DMRS symbol of the PDSCH is modified based on modification parameters. In the example illustrated in FIG. 7C, each DMRS symbol location is incremented by a first value, that is one.

FIGS. 8A-8C are block diagrams illustrating an example of DMRS modifications for multiple PDSCHs. Referring to FIG. 8A a block diagram illustrating an example DMRS pattern/scheme is illustrated. FIG. 8A depicts an example of a DMRS pattern for a PDSCH. The PDSCH includes 14 symbols in the example of FIG. 8A. A first four symbols are unused by the DMRS and for data (that is not assigned to PDSCH), and may correspond to gaps or control data. The remaining 10 symbols may be used for DMRS and data. As illustrated in FIG. 8A, the DMRS of the PDSCH includes 4 DMRS symbols. The four DMRS symbols are located at symbols 5, 9, and 12 of the PDSCH, when the numbering starts from 1.

Referring to FIG. 8B, a block diagram illustrating an example CRS pattern/scheme is illustrated. FIG. 8B depicts an example of a CRS pattern (such as one CRS pattern of possibly many CRS patterns configured for a component carrier). Similar to FIG. 8A, the PDSCH includes 14 symbols in the example of FIG. 8B. All or a portion of the symbols of the PDSCH may be used for CRS, such as for CRS rate matching, and may correspond to CRS blocks. As illustrated in FIG. 8B, the CRS includes or occupies 6 symbols. The six symbols are located at symbols 1, 2, 5, 8, 9, and 12 of the PDSCH, when the numbering starts from 1.

Referring to FIG. 8C, a block diagram illustrating an example DMRS modification is illustrated. FIG. 8C illustrates DMRS shifting by incrementing of a location of each DMRS symbol of overlapping transmissions, such as PDSCHs.

In FIG. 8C, two partially overlapping PDSCHs are illustrated. The PDSCHs (which correspond to two TRPs, two higher layer indices, or two CORESET groups) have the DMRS pattern or scheme as illustrated in FIG. 8A. Additionally, the PDSCHs have or are associated with the CRS pattern or scheme illustrated in FIG. 8B. Alternatively, the CRS pattern may be associated with only one of the PDSCHs. As illustrated in FIG. 8C, multiple DMRS symbols, locations thereof, overlap with the CRS blocks of the CRS pattern illustrated in FIG. 8B. Specifically, each of the DMRS symbols (5, 9, and 12) of each PDSCH overlap with the CRS resources/symbols of the CRS pattern. Accordingly, each DMRS symbol of each PDSCH is modified based on the overlap of one or more DMRS symbols and CRS blocks/locations. This may be done irrespective of the association of the CRS pattern with the two PDSCH (i.e., is done for both PDSCHs).

For example, a location of each DMRS symbol of each PDSCH is modified based on modification parameters. In the example illustrated in FIG. 8C, each DMRS symbol location is incremented by a first value, that is one. Although incrementing is shown, in some other implementations, the DMRS symbol locations may be decremented, divided, multiplied, adjusted using a table or formula, or a combination thereof. Additionally, although a value of one is applied to the incrementing of DMRS symbol locations, in some other implementations, other values may be used, such as two, three, four, etc.

Although each DMRS symbol overlaps with a CRS resource and each DMRS symbol is moved, in some other implementations, each DMRS symbol is moved based on only a single DMRS symbol and CRS resource overlap in one PDSCH. Additionally, or alternatively, although the PDSCHs partially overlap in both time and frequency, the PDSCHs may fully overlap in time, frequency, or both, or may partially overlap in time or frequency in some other implementations.

When there are one or more CRS patterns (such as lte-CRS-ToMatchAround or its extension for multiple CRS patterns) to rate match around for deciding whether any DMRS symbols of the two PDSCHs (corresponding to the two TRPs, two higher layer indices, or two CORESET groups) are shifted, the one or more CRS patterns may be considered for both PDSCHs irrespective of the association of the PDSCHs to the CRS patterns (i.e., the association with the TRPs, higher layer indices, or CORESET groups).

For example, when only one CRS pattern or set of CRS patterns (such as lte-CRS-ToMatchAround) is configured and is associated with the first TRP (such as a first higher layer index value, i.e., a first CORESET group), and the two PDSCHs are partially/fully overlapping, DMRS of both PDSCHs shift even though the CRS pattern(s) is/are associated only with one PDSCH (such as the second PDSCH).

In some implementations, for shifting the DMRS pattern (i.e., if the DMRS is in the same symbol as the CRS), both PDSCHs follow the same behavior irrespective of association of the CRS pattern. Additionally, or alternatively, for rate matching, only the first PDSCH may be rate matched around the resources of the CRS pattern and the second PDSCH may not be rate matched around the resources of the CRS pattern (which is configured for the CORESET and component carrier). That is, even though PDSCH rate matching may take into account the association of a CRS pattern (or a list of CRS patterns) with a TRP (or with a CORESET group), DMRS shifting is performed irrespective of the association of PDSCHs with a TRP (or with a CORESET group) or the association of a CRS pattern (or a list of CRS patterns) with a TRP (or with a CORESET group).

A CRS pattern or list of CRS patterns can be configured for a multi-TRP UE in general, configured in a serving cell, and configured for a higher layer index value (i.e., CORESET group). Accordingly, the one or more CRS patterns are intended as design options for a component carrier and a TRP (CORESET group) within the component carrier, and thus the one or more CRS patterns are configured for a component carrier and a TRP.

Though the PDSCHs have the same DMRS pattern in the example provided herein, in some other implementations the PDSCHs may have different DMRS patterns from each other. In such implementations, the DMRS pattern of one or both may be adjusted based on a collision of either of the DMRS patterns.

Figure 11:
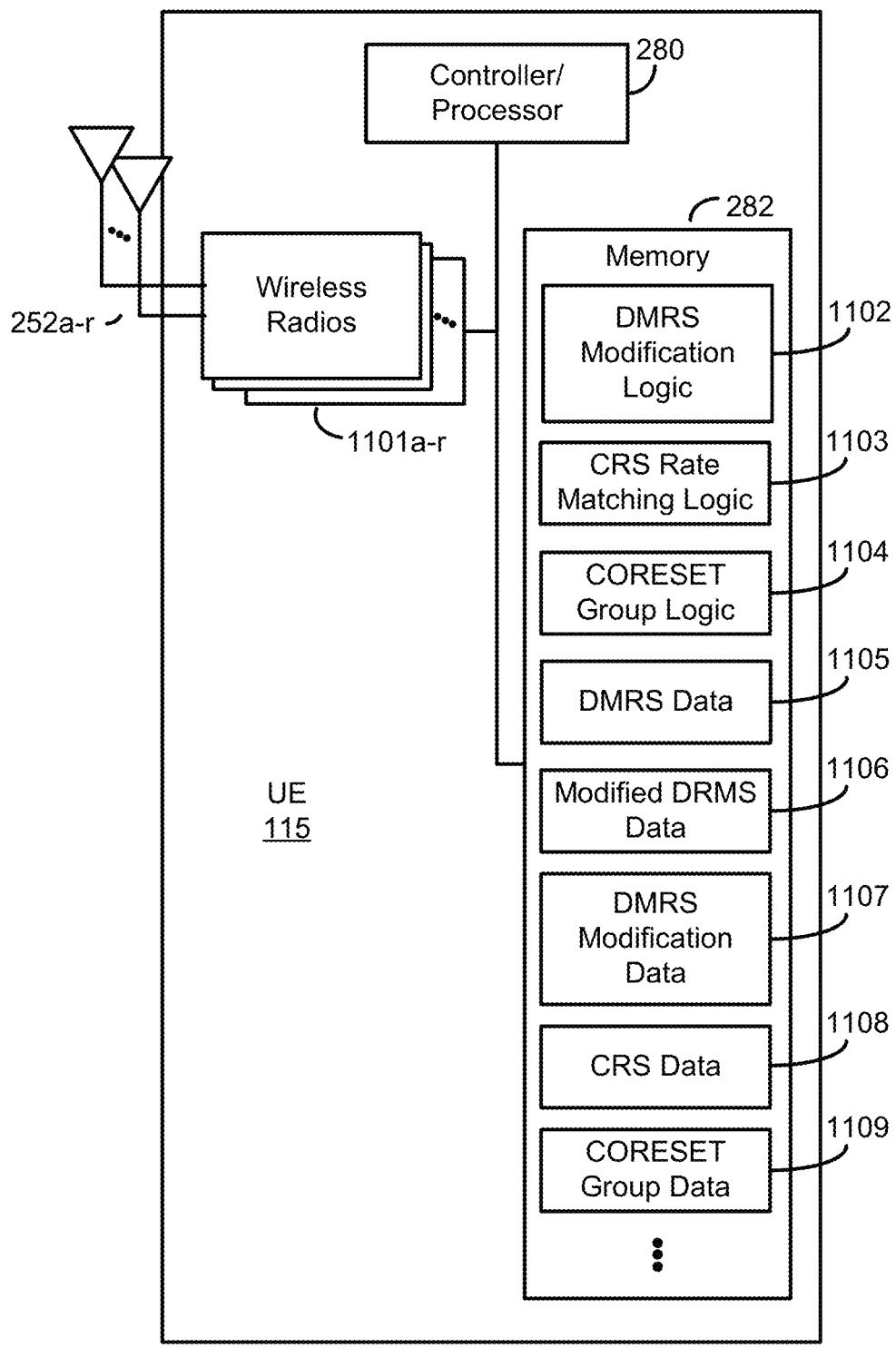
FIG. 11 is a block diagram conceptually illustrating an example design of a UE.

FIG. 9 is a block diagram illustrating example blocks executed by a UE. The example blocks will also be described with respect to the UE 115 as illustrated in FIG. 11. FIG. 11 is a block diagram conceptually illustrating an example design of a UE. FIG. 11 illustrates a UE 115 configured according to one aspect of the present disclosure. The UE 115 includes the structure, hardware, and components as illustrated for the UE 115 of FIG. 2 or 6. For example, the UE 115 includes the controller/processor 280, which operates to execute logic or computer instructions stored in the memory 282, as well as controlling the components of the UE 115 that provide the features and functionality of the UE 115. The UE 115, under control of the controller/processor 280, transmits and receives signals via the wireless radios 1101a-r and the antennas 252a-r. The wireless radios 1101a-r includes various components and hardware, as illustrated in FIG. 2 for the UE 115, including the modulator/demodulators 254a-r, the MIMO detector 256, the receive processor 258, the transmit processor 264, and the TX MIMO processor 266.

As shown, the memory 282 may include DMRS Modification Logic 1102, CRS Rate Matching Logic 1103, CORESET Group Logic 1104, DMRS data 1105, modified DMRS data 1106, DMRS Modification data 1107, CRS data 1108, and CORESET Group data 1109. The DMRS data 1105, the modified DMRS data 1106, the DMRS modification data 1107, CRS data 1108, and the CORESET Group data 1109 may include or correspond to DMRS data 606, CRS data 608, CORESET data 642, and modifying parameters 644. The DMRS Modification Logic 1102 may include or correspond to the DMRS modifier 615. The CRS Rate Matching Logic 1103 may include or correspond to the CRS rate matcher 616. The CORESET Group Logic 1104 may include or correspond to the DMRS modifier 615, the CRS rate matcher 616, or both. In some aspects, the logic 1102-1104, may include or correspond to processor(s) 280. The UE 115 may receive signals from or transmit signals to a base station or base stations, such as the base station 105 or the network entity or entities 605, 607. When communicating with a single base station or serving cell, the UE 115 may receive signals from or transmit signals to multiple TRPs of the single base station or serving cell.

Referring to FIG. 9, at block 900, the UE receives a configuration message including at least one list of CRS patterns for a component carrier. A list of the at least one list is associated with a control resource set (CORESET) group.

At block 901, the UE receives a first message scheduling a first transmission associated with a first demodulation reference signal (DMRS) and for the component carrier.

At block 902, the UE receives a second message scheduling a second transmission associated with a second DMRS and for the component carrier. In some implementations, the first and second messages are DCIs or RRC messages. Additionally, or alternatively, the first and second transmissions are PDSCH transmissions. The first and second DMRS may be aligned, such as have the same symbol locations in some implementations.

At block 903, the UE optionally determines whether one or more CRS patterns overlap with the first DMRS or the second DMRS. The determination may be based on whether the one or more CRS patterns are configured for the UE (for example, as described in Technical Specification (TS) 38.211 v16.1.0, section 7.4.1.1.2). In some implementations, a single CRS pattern associated with multiple TRPs is used.

In some other implementations, each TRP has an associated CRS pattern, and each CRS pattern is checked for overlap with each DMRS.

At block 904, the UE modifies at least one DMRS symbol of the first DMRS or at least one DMRS symbol of the second DMRS based on the list being configured for the component carrier.

In some implementations, the method may further include determining whether the first transmission at least partially overlaps with the second transmission (such as same component carrier and different CORESET groups). For example, first resources of the first transmission are checked for overlap with second resources of the second transmission, in a time domain, frequency domain, or both. In some such implementations, one or more of the previous described blocks are performed responsive to or based on such as determination. To illustrate, DMRS modification or determinations for overlap may not be performed based on the UE determining that the first transmission does not overlap with the second transmissions, such as in the case of orthogonal resource blocks.

In some implementations, the method may further include receiving the first and second transmission with modified DMRS symbols. To illustrate, the UE 115 may receive the first and second transmission which have locations of DMRS symbols shifted as compared to the DMRS patterns indicated by or associated with the correspond first and second messages.

Figure 12:
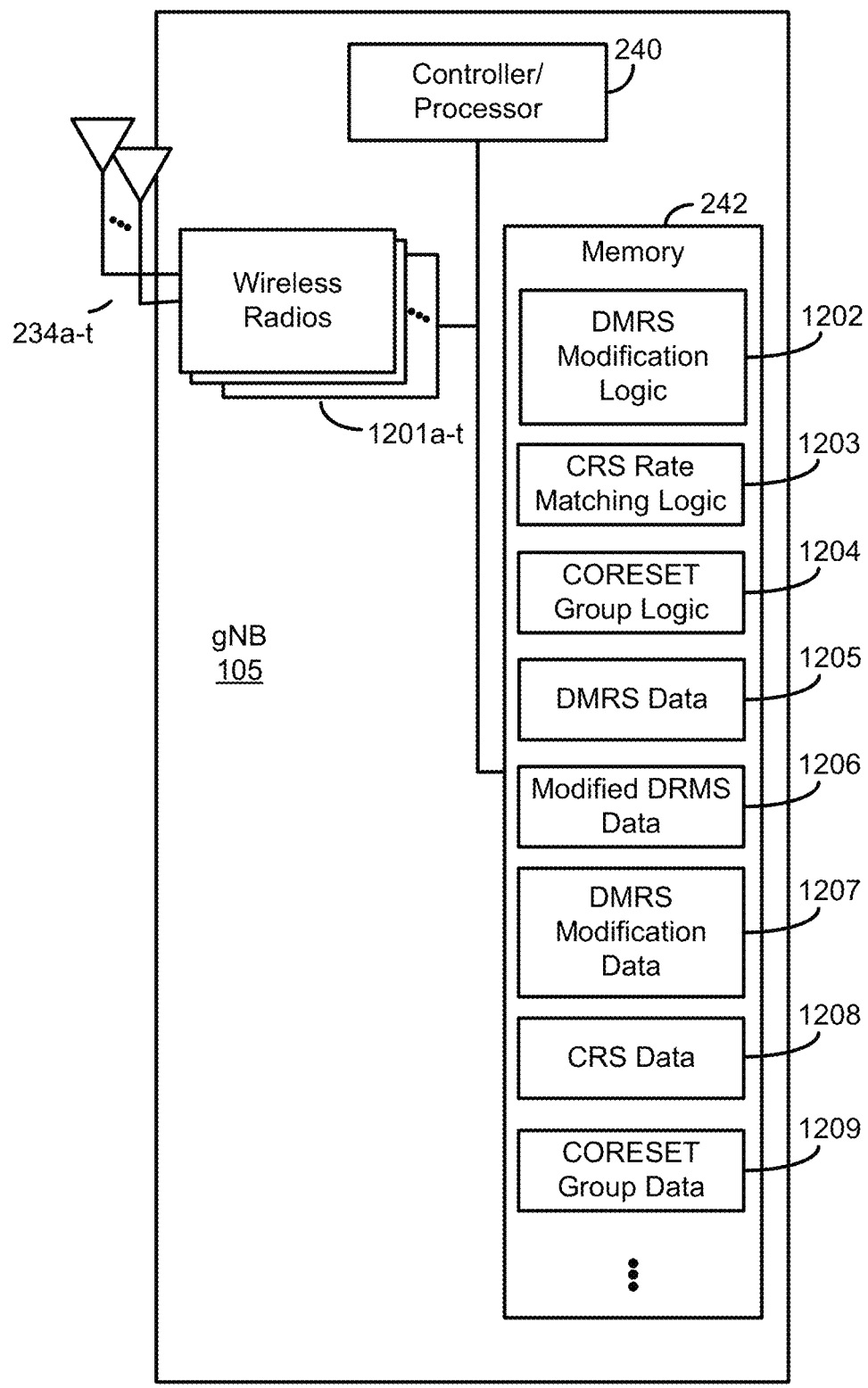
FIG. 12 is a block diagram conceptually illustrating an example design of a network entity.

FIG. 10 is a block diagram illustrating example blocks executed by a network entity. The network entity may include or correspond to as base station or TRP thereof, configured according to an aspect of the present disclosure. The example blocks will also be described with respect to gNB 105 (or eNB) as illustrated in FIG. 12. FIG. 12 is a block diagram conceptually illustrating an example design of a network entity. FIG. 12 illustrates a gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1201a-t and antennas 234a-r. Wireless radios 1201a-t includes various components and hardware, as illustrated in FIG. 2 for gNB 105, including modulator/demodulators 232a-t, MIMO detector 236, receive processor 238, transmit processor 220, and TX MIMO processor 230. The data 1202-1209 in memory 242 may include or correspond to the corresponding data 1102-1109 in memory 282, respectively.

Referring to FIG. 10, at block 1000, the network entity transmits a configuration message including at least one list of CRS patterns for a component carrier. A list of the at least one list is associated with a control resource set (CORESET) group.

At block 1001, a network entity transmits a first message scheduling a first transmission associated with a first demodulation reference signal (DMRS) and for the component carrier.

At block 1002, the network entity transmits a second message scheduling a second transmission associated with a second DMRS and for the component carrier. In some implementations, the first and second message are DCIs or RRC messages. Additionally, or alternatively, the first and second transmissions are PDSCH transmissions. The first and second DMRS may be the same, such as have the same symbol locations in some implementations.

At block 1003, the network entity optionally determines whether one or more CRS patterns overlap with the first DMRS or the second DMRS. The determination may be based on whether the one or more CRS patterns are configured for the UE (for example, as described in 5G NR Technical Specification (TS) 38.211 v16.1.0, section 7.4.1.1.2). In some implementations, a single CRS pattern associated with multiple TRPs is used. In some other implementations, each TRP has an associated CRS pattern, and each CRS pattern is checked for overlap with each DMRS.

At block 1004, the network entity modifies at least one DMRS symbol of the first DMRS or at least one DMRS symbol of the second DMRS responsive to determining that the list is configured for the component carrier.

In some implementations, the method may further include determining whether the first transmission at least partially overlaps with the second transmission (such as same component carrier and different CORESET groups). For example, first resources of the first transmission are checked for overlap with second resources of the second transmission, in a time domain, frequency domain, or both. In some such implementations, one or more of the previous described blocks are performed responsive to or based on such as determination. To illustrate, DMRS modification or determinations for overlap may not be performed based on the network entity determining that the first transmission does not overlap with the second transmissions, such as in the case of orthogonal resource blocks.

In some implementations, the method may further include transmitting the first transmission, the second transmission, or both. When transmitted, the first and second transmissions may have modified DMRS symbols. To illustrate, the network entity may transmit the first and second transmission which have locations of DMRS symbols shifted as compared to the DMRS patterns indicated by or associated with the correspond first and second messages.

It is noted that one or more blocks (or operations) described with reference to FIGS. 9 and 10 may be combined with one or more blocks (or operations) of another of figure. For example, one or more blocks of FIGS. 9 and 10 may be combined with one or more blocks (or operations) of another of FIG. 2, 3, 4, 6, or 10. Additionally, or alternatively, one or more operations described above with reference to FIGS. 1-6 may be combined with one or more operations described with reference to FIGS. 9 and 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein (such as components of FIG. 6, functional blocks of FIGS. 9 and 10, and modules in FIG. 2) may include processors, electronics devices, hardware devices, electronics components, logical circuits, memories, software codes, firmware codes, etc., or any combination thereof. In addition, features discussed herein relating to components, the functional blocks, and the modules described herein (such as components of FIG. 6, functional blocks of FIGS. 9 and 10, and modules in FIG. 2) may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising:
   receiving, by a user equipment (UE), a configuration message including at least one list of cell specific reference signal (CRS) patterns for a component carrier, wherein a list of the at least one list is associated with a control resource set (CORESET) group;
   receiving, by the UE, a first message scheduling a first transmission associated with a first demodulation reference signal (DMRS) and for the component carrier;
   receiving, by the UE, a second message scheduling a second transmission associated with a second DMRS and for the component carrier; and
   modifying, by the UE, at least one DMRS symbol of the first DMRS or at least one DMRS symbol of the second DMRS based on the list being configured for the component carrier, wherein the first DMRS includes multiple DMRS symbols, and wherein modifying the at least one DMRS symbol of the first DMRS or the second DMRS includes:
   incrementing a location value of each DMRS symbol of the multiple DMRS symbols of the first DMRS of the first transmission by one.

2. The method of claim 1, wherein the first transmission is associated with the CORESET group, and wherein the second transmission is associated with a second CORESET group.

3. The method of claim 1, wherein determining that the at least one list is configured for DMRS shifting indicates that one or more CRS patterns overlap with the first DMRS or the second DMRS.

4. The method of claim 1, further comprising determining, by the UE, whether one or more CRS patterns of the at least one list overlaps with the first DMRS or the second DMRS, wherein modifying the at least one DMRS symbol of the first DMRS or the at least one DMRS symbol of the second DMRS is further responsive to determining that at least one CRS pattern of the one or more CRS patterns overlaps with at least one DMRS symbol of the first DMRS or the second DMRS.

5. The method of claim 1, wherein the at least one list of CRS patterns being configured for the component carrier enables DMRS shifting, rate matching, or both.

6. The method of claim 1, wherein modifying the at least one DMRS symbol of the first DMRS or the at least one DMRS symbol of the second DMRS further includes:
   modifying the at least one DMRS symbol of the second DMRS.

7. The method of claim 1, further comprising, receiving, by the UE, the first transmission, the first transmission having modified DMRS symbols.

8. The method of claim 7, further comprising, receiving, by the UE, the second transmission, the second transmission having multiple modified DMRS symbols.

9. An apparatus for wireless communication, comprising:
   at least one processor; and
   a memory coupled to the at least one processor,
   wherein the at least one processor is configured to:
   receive a configuration message including at least one list of cell specific reference signal (CRS) patterns for a component carrier, wherein a list of the at least one list is associated with a control resource set (CORESET) group;

receive a first message scheduling a first transmission associated with a first demodulation reference signal (DMRS) and for the component carrier;

receive a second message scheduling a second transmission associated with a second DMRS and for the component carrier; and modify at least one DMRS symbol of the first DMRS or at least one DMRS symbol of the second DMRS based on the list being configured for the component carrier, wherein the first DMRS includes multiple DMRS symbols, and wherein modifying the at least one DMRS symbol of the first DMRS or the second DMRS includes:

incrementing a location value of each DMRS symbol of the multiple DMRS symbols of the first DMRS of the first transmission by one.

10. The apparatus of claim 9, wherein the apparatus is operating in a multiple downlink control information (DCI), multiple transmission reception point (TRP) mode.

11. The apparatus of claim 9, wherein a second CORSET group is associated with a second list of CRS patterns of the at least one list of CRS patterns.

12. The apparatus of claim 9, wherein the first message is received on a Physical Downlink Control Channel (PDCCH), and wherein the first transmission is received on a Physical Downlink Shared Channel (PDSCH).

13. The apparatus of claim 9, wherein modifying the at least one DMRS symbol of the first DMRS or the second DMRS further includes:

adjusting a location of the at least one DMRS symbol of the second DMRS.

14. The apparatus of claim 9, wherein modifying the at least one DMRS symbol of the first DMRS or the second DMRS further includes:

incrementing a location value of each DMRS symbol of the second DMRS of the second transmission by one.

15. The apparatus of claim 9, wherein the apparatus performs DMRS shifting for multiple downlink control information (DCI), multiple transmission reception point (TRP) modes independent of CRS and TRP associations.

16. The apparatus of claim 9, wherein the apparatus performs DMRS shifting across multiple transmission reception points (TRPs), and wherein the apparatus performs rate matching per TRP.

17. A method of wireless communication, comprising:

transmitting, by a network entity, a configuration message including at least one list of cell specific reference signal (CRS) patterns for a component carrier, wherein a list of the at least one list is associated with a control resource set (CORESET) group;

transmitting, by the network entity, a first message scheduling a first transmission associated with a first demodulation reference signal (DMRS) and for the component carrier;

transmitting, by the network entity, a second message scheduling a second transmission associated with a second DMRS and for the component carrier; and modifying, by the network entity, at least one DMRS symbol of the first DMRS or at least one DMRS symbol of the second DMRS responsive to determining that the list is configured for the component carrier, wherein the first DMRS includes multiple DMRS symbols, and wherein modifying the at least one DMRS symbol of the first DMRS or the second DMRS includes:

incrementing a location value of each DMRS symbol of the multiple DMRS symbols of the first DMRS of the first transmission by one.

18. The method of claim 17, wherein the first transmission is associated with the CORESET group, and wherein the second transmission is associated with a second CORESET group.

19. The method of claim 17, wherein modifying the at least one DMRS symbol of the first DMRS or the at least one DMRS symbol of the second DMRS includes:

modifying the at least one DMRS symbol of the first DMRS and the at least one DMRS symbol of the second DMRS.

20. The method of claim 17, further comprising:

transmitting, by the network entity, the first transmission with a modified DMRS symbol;

transmitting, by the network entity, the second transmission with a modified DMRS symbol; or both.

21. The method of claim 17, wherein a second CORESET group is associated with a second list of CRS patterns of the at least one list of CRS patterns.

22. The method of claim 17, wherein the first message corresponds to downlink control information (DCI).

23. The method of claim 17, wherein the first message comprises a periodic grant and corresponds to downlink control information (DCI) or a Radio Resource Control (RRC) message that is configured to schedule multiple transmissions including the first transmission.

24. An apparatus for wireless communication, comprising:

at least one processor; and a memory coupled to the at least one processor, wherein the at least one processor is configured to:

transmit a configuration message including at least one list of cell specific reference signal (CRS) patterns for a component carrier, wherein a list of the at least one list is associated with a control resource set (CORESET) group;

transmit a first message scheduling a first transmission associated with a first demodulation reference signal (DMRS) and for the component carrier;

transmit a second message scheduling a second transmission associated with a second DMRS and for the component carrier; and modify at least one DMRS symbol of the first DMRS or at least one DMRS symbol of the second DMRS responsive to determining that the list is configured for the component carrier, wherein the first DMRS includes multiple DMRS symbols, and wherein to modifying the at least one DMRS symbol of the first DMRS or the second DMRS includes:

incrementing a location value of each DMRS symbol of the multiple DMRS symbols of the first DMRS of the first transmission by one.

25. The apparatus of claim 24, wherein modifying the at least one DMRS symbol of the first DMRS or the second DMRS further includes:

adjusting a location of the at least one DMRS symbol of the second DMRS.

26. The apparatus of claim 24, wherein the second DMRS includes multiple DMRS symbols, and wherein modifying the at least one DMRS symbol of the first DMRS or the second DMRS further includes:

incrementing a location value of each DMRS symbol of the multiple DMRS symbols the second DMRS of the second transmission by one.

27. The apparatus of claim 24, wherein first resources of the first transmission at least partially overlap with second resources of the second transmission in a time domain, a frequency domain, or both.

28. The apparatus of claim 24, wherein first resources of the first transmission are orthogonal to second resources of the second transmission in a time domain, a frequency domain, or both.

29. The apparatus of claim 24, wherein first resources of the first transmission do not overlap with second resources of the second transmission in a time domain, a frequency domain, or both.

30. The apparatus of claim 24, wherein the first message corresponds to the CORESET group, wherein the second message corresponds to a second CORESET group, and wherein the CORSET groups are indicated by higher level signaling.

\* \* \* \* \*